US012580272B2

(12) United States Patent (10) Patent No.: US 12,580,272 B2
Yushin et al. (45) Date of Patent: Mar. 17, 2026

(54) NANOCOMPOSITE MEMBRANE, ELECTROLYTE-SEPARATOR COMPOSITE FOR A BATTERY, AND METHOD OF MAKING A NANOCOMPOSITE MEMBRANE

(71) Applicant: Sila Nanotechnologies Inc., Alameda, CA (US)

(72) Inventors: Gleb Yushin, Atlanta, GA (US); Wenqiang Hu, Atlanta, GA (US); Wenbin Fu, Atlanta, GA (US); Samik Jhulki, Atlanta, GA (US); Liang Chen, Atlanta, GA (US)

(73) Assignees: SILA NANOTECHNOLOGIES, INC., Alameda, CA (US); GEORGIA TECH RESEARCH CORPORATION, Atlanta, GA (US)

( * ) Notice: Subject to any disclaimer, the term of this patent is extended or adjusted under 35 U.S.C. 154(b) by 748 days.

(21) Appl. No.: 17/929,060

(22) Filed: Sep. 1, 2022

(65) Prior Publication Data

US 2023/0067283 A1 Mar. 2, 2023

Related U.S. Application Data

(60) Provisional application No. 63/239,770, filed on Sep. 1, 2021.

(51) Int. Cl.
    H01M 50/446 (2021.01)
    H01M 10/0568 (2010.01)
    H01M 10/0569 (2010.01)
    H01M 50/403 (2021.01)
    H01M 50/414 (2021.01)
    H01M 50/434 (2021.01)
    H01M 50/44 (2021.01)
    H01M 50/491 (2021.01)
    H01M 50/497 (2021.01)

(52) U.S. Cl.
    CPC ..... *H01M 50/446* (2021.01); *H01M 10/0568* (2013.01); *H01M 10/0569* (2013.01); *H01M 50/403* (2021.01); *H01M 50/414* (2021.01); *H01M 50/434* (2021.01); *H01M 50/44* (2021.01); *H01M 50/491* (2021.01); *H01M 50/497* (2021.01); H01M 2300/004 (2013.01)

(58) Field of Classification Search
    None
    See application file for complete search history.

(56) References Cited

U.S. PATENT DOCUMENTS

2019/0198837 A1* 6/2019 Yushin ................ H01M 50/446
2019/0237732 A1* 8/2019 Hu ...................... H01M 50/417

* cited by examiner

*Primary Examiner* — Alix E Eggerding
(74) *Attorney, Agent, or Firm* — MUNCY GEISSLER OLDS & LOWE, P.C.; Daniel Podhanjy

(57) ABSTRACT

A nanocomposite membrane includes a polymer phase, a nanowire phase, and a pore phase. The polymer phase includes a polymer including a cyclic imide group. The nanowire phase includes metal oxide nanowires. Each of the polymer phase and the nanowire phase is uniformly distributed within at least part of the nanocomposite membrane.

17 Claims, 29 Drawing Sheets

ULTRASONICATION   CASTING ON THE GLASS PLATE   90-100% HUMIDITY CHAMBER AT 50°C

DISPERSION

Al₂O₃ NWs   PEI-PVP-Al₂O₃ IN NMP SOLUTION

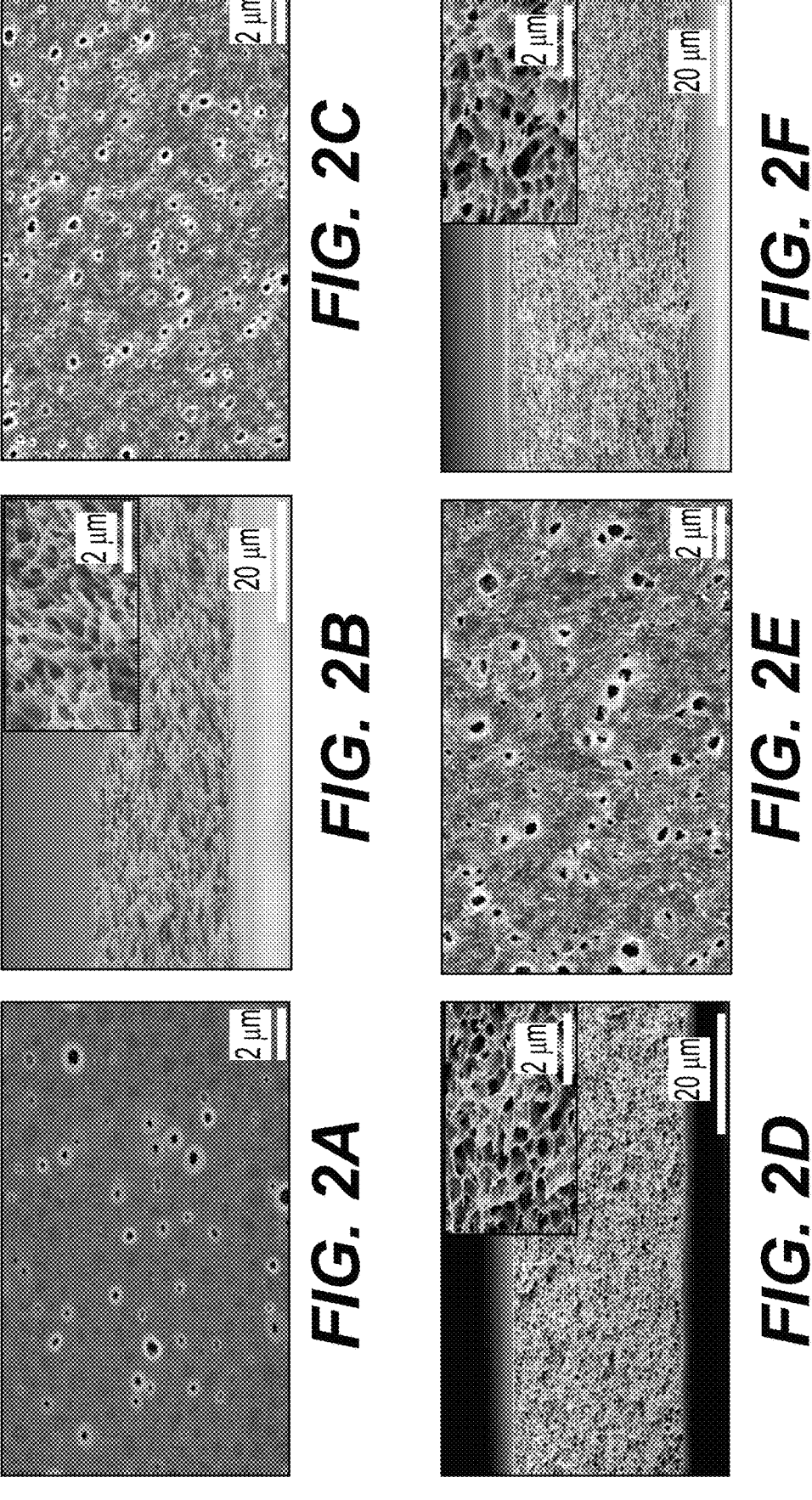
*FIG. 2A*     *FIG. 2B*     *FIG. 2C*
*FIG. 2D*     *FIG. 2E*     *FIG. 2F*

FIG. 3E    FIG. 3F    FIG. 3G    FIG. 3H

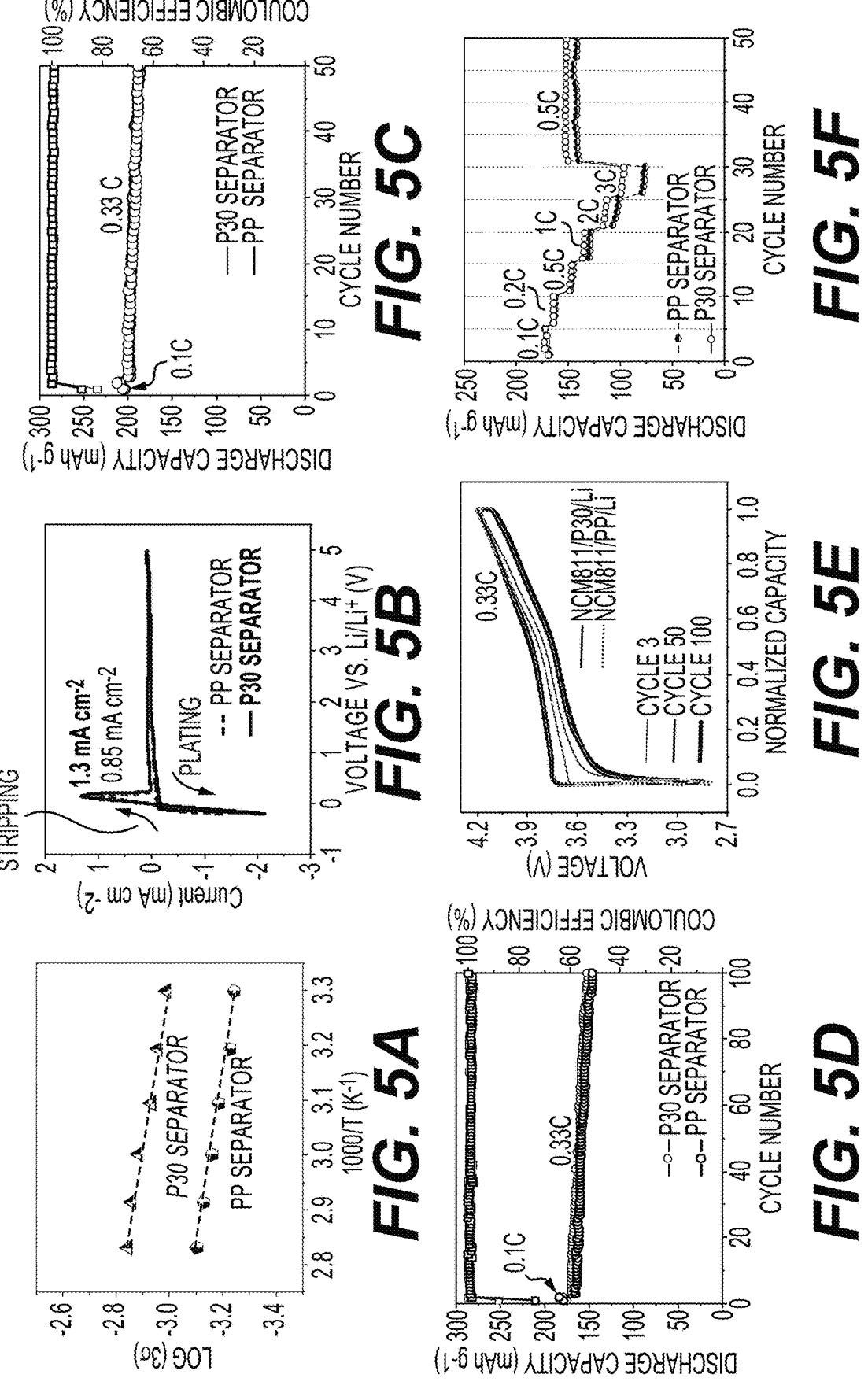

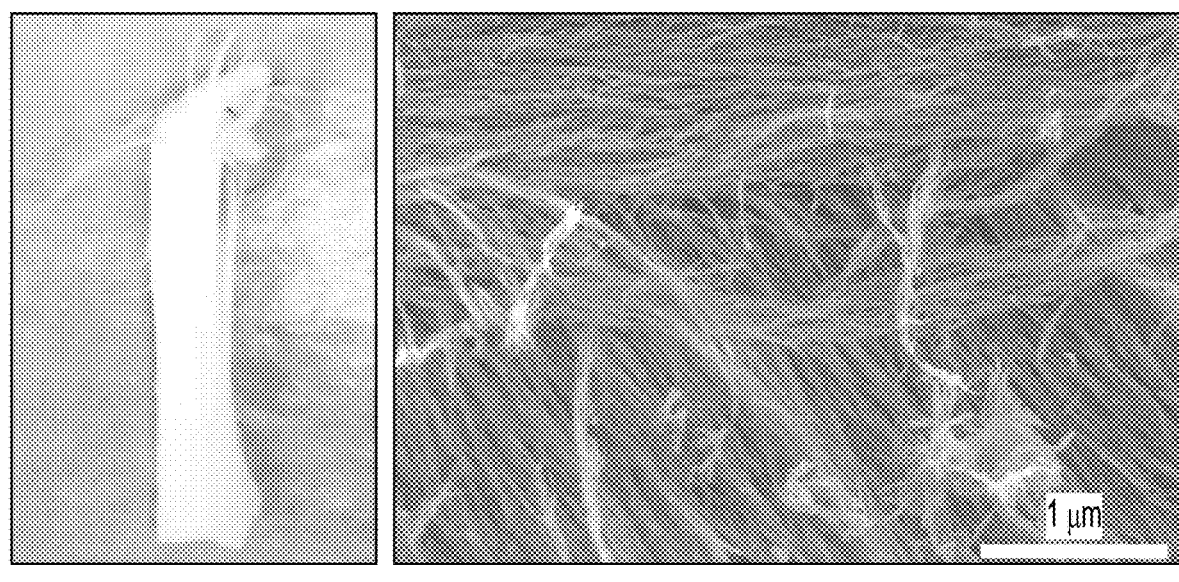
FIG. 6A          FIG. 6B
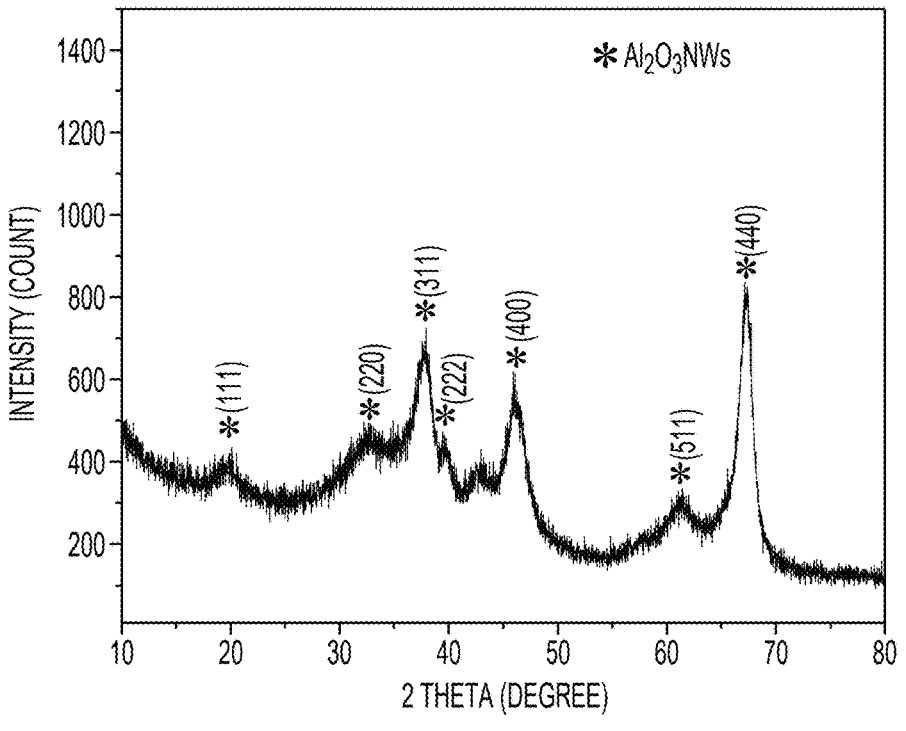
FIG. 6C

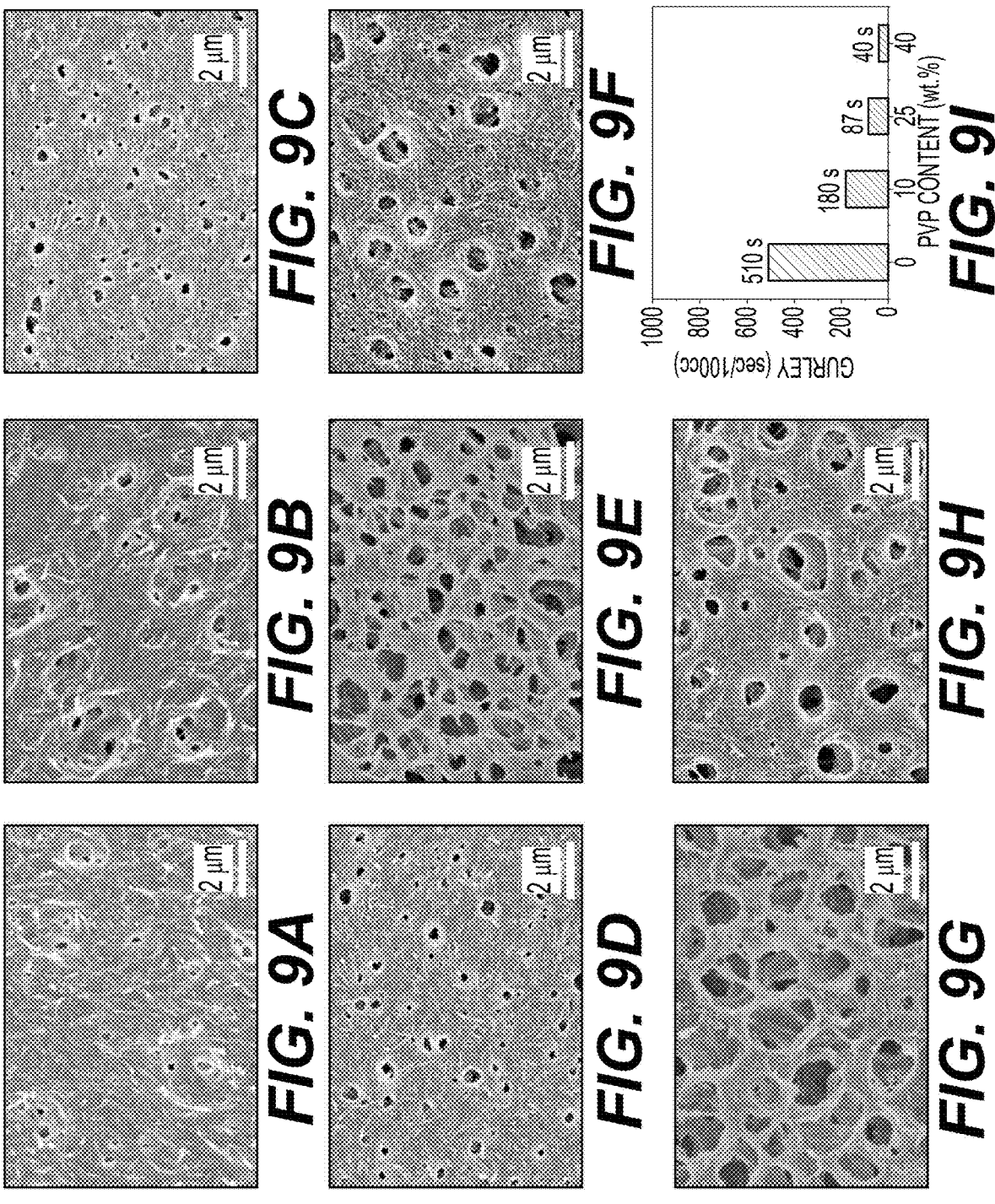

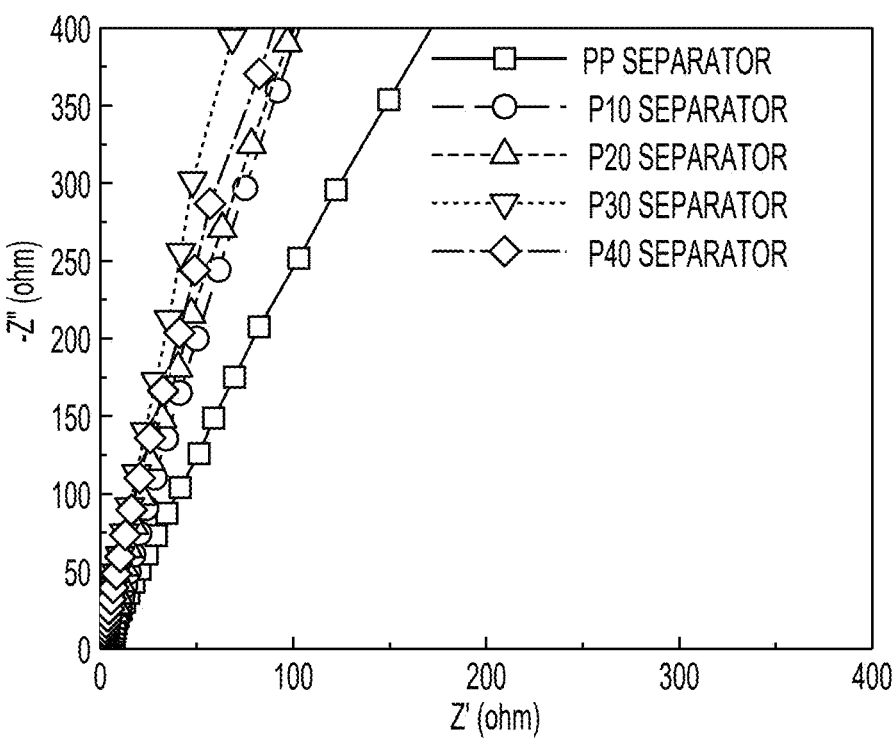
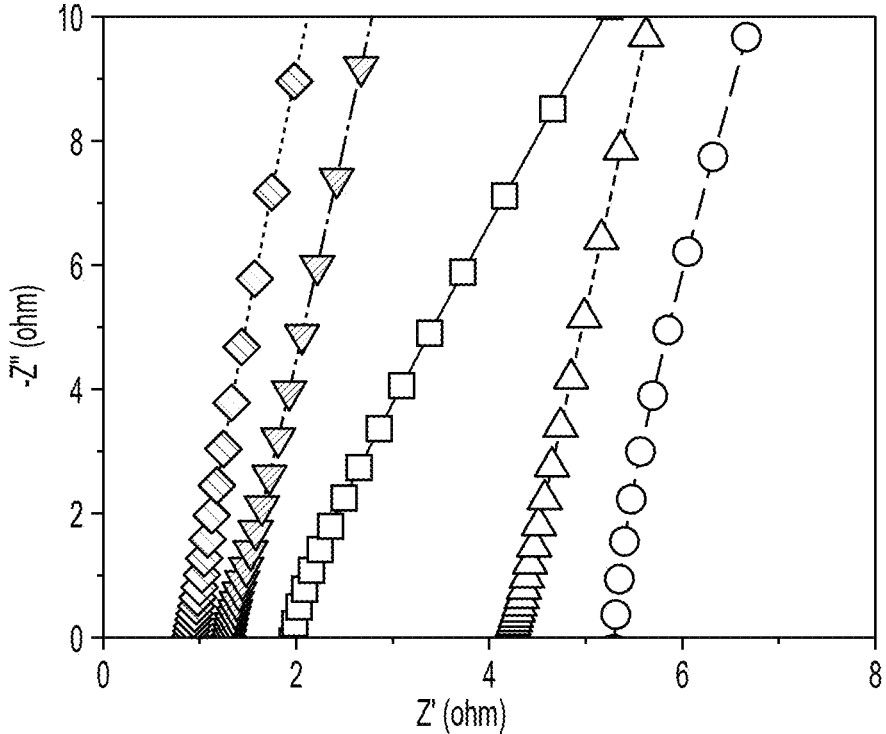
*FIG. 14*

| | $R_s$ | $R_{ct}$ |
|---|---|---|
| P30 | 3.52 | 70.1 |
| PP | 4.15 | 131 |

*UNIT: ohm

THF

DMF

R————OH
R = Me, Et, Pr, Bu

ALCOHOLS

DMAC

ACETONITRILE

NMP

ACETONE 1,4-DIOXANE

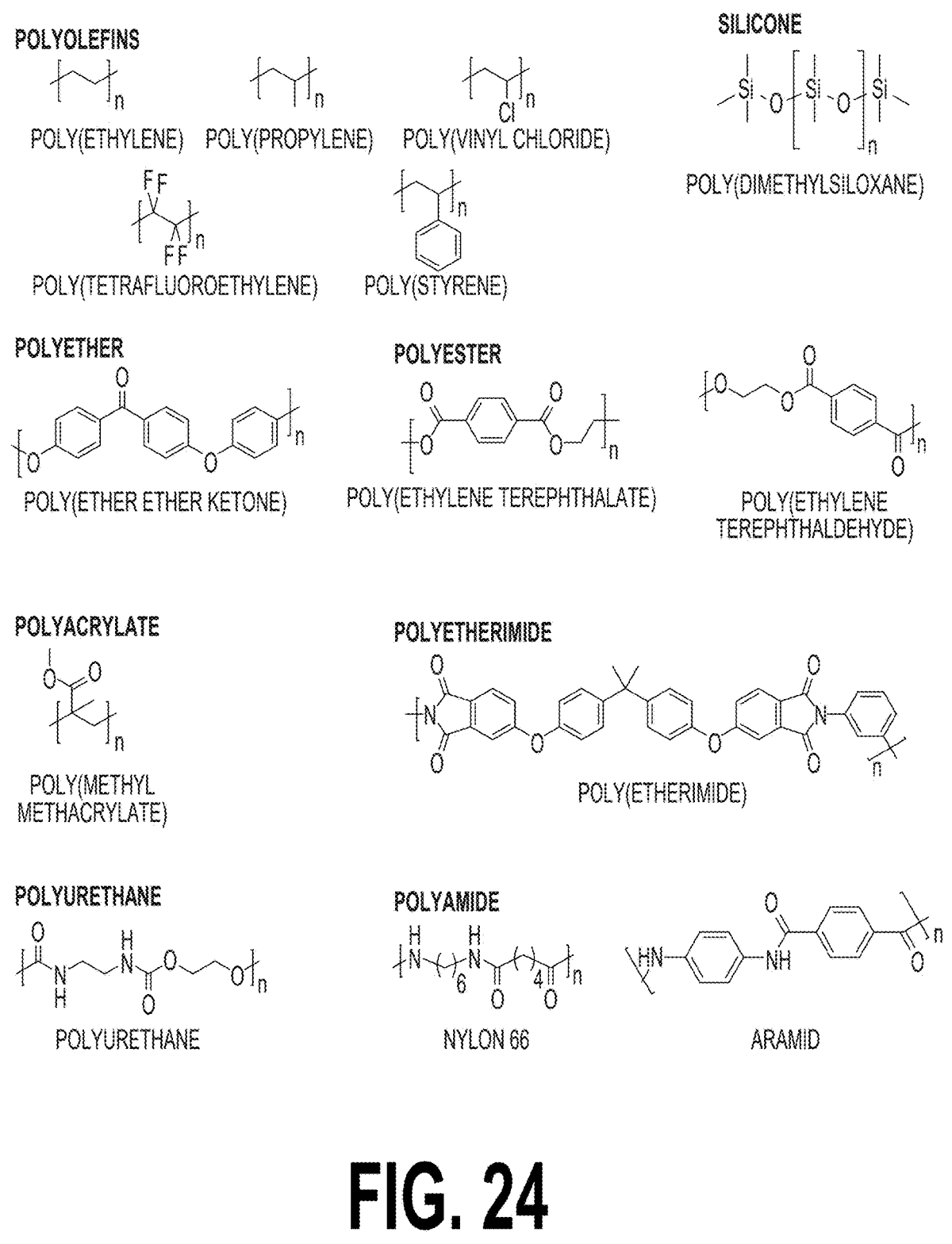

POLYOLEFINS

POLY(ETHYLENE)     POLY(PROPYLENE)     POLY(VINYL CHLORIDE)

SILICONE

POLY(DIMETHYLSILOXANE)

POLY(TETRAFLUOROETHYLENE)     POLY(STYRENE)

POLYETHER

POLY(ETHER ETHER KETONE)

POLYESTER

POLY(ETHYLENE TEREPHTHALATE)

POLY(ETHYLENE TEREPHTHALDEHYDE)

POLYACRYLATE

POLY(METHYL METHACRYLATE)

POLYETHERIMIDE

POLY(ETHERIMIDE)

POLYURETHANE

POLYURETHANE

POLYAMIDE

NYLON 66

ARAMID

FIG. 24

R = Et, Pr, Bu, CF₃, CF₂CF₃, OMe, SMe

FIG. 25

| MATERIAL | HANSEN PARAMETERS (MPa$^{1/2}$) | | | $R_{HSP}$ (MPa$^{1/2}$) |
|---|---|---|---|---|
| | $\delta_d$ | $\delta_p$ | $\delta_h$ | NMP—WATER |
| NMP | 18.0 | 12.3 | 7.2 | 35.4 |
| WATER | 15.6 | 16 | 42.3 | |

FIG. 26

| SEPARATORS | PP | P10 | P20 | P30 | P40 |
|---|---|---|---|---|---|
| THICKNESS(μm) | 25 | 31 | 33 | 30 | 32 |
| POROSITY(%) | 45 | 47 | 54 | 62 | 69 |
| GURLEY VALUE (S) | 502 | 289 | 231 | 167 | 115 |
| ELECTROLYTE UPTAKE (%) | 71 | 117 | 142 | 165 | 191 |
| IONIC CONDUCTIVITY (mS cm$^{-1}$) | 0.6 | 0.63 | 0.85 | 1.07 | 1.42 |
| McMULLIN NUMBER ($N_M$) | 12.58 | 11.98 | 8.88 | 6.62 | 5.32 |
| TORTUOSITY (t) | 2.38 | 2.37 | 2.19 | 2.04 | 1.92 |

FIG. 27

| SEPARATOR | TENSILE STRENGTH (MPa) | REFERENCE |
|---|---|---|
| PE1-12.16vol.%AlN NP COMPOSITE | 7.7 | [2] |
| BOEHMITE-PVDF COMPOSITE | 6.3 | [3] |
| MgAl2O4 NP-PVDF COMPOSITE | 1.5 | [4] |
| ZrO2 FIBER-(PVDF-HFP) COMPOSITE | 5 | [5] |
| HAP NWs SEPARATOR | 6.7 | [6] |
| HAP/CF SEPARATOR COMPOSITE | 13.21 | [6] |
| NCC-REINFORCED PH COMPOSITE | 8 | [7] |
| PURE PEI | 16 | THIS WORK |
| PEI-10wt.% $AL_2O_3$ NWS | 22.5 | THIS WORK |
| PEI-20wt.% $AL_2O_3$ NWS | 21.7 | THIS WORK |
| PEI-30wt.% $AL_2O_3$ NWS | 16.2 | THIS WORK |
| PEI-40wt.% $AL_2O_3$ NWS | 14.3 | THIS WORK |

FIG. 28

NANOCOMPOSITE MEMBRANE, ELECTROLYTE-SEPARATOR COMPOSITE FOR A BATTERY, AND METHOD OF MAKING A NANOCOMPOSITE MEMBRANE

CROSS-REFERENCE TO RELATED APPLICATIONS

The present Application for Patent claims the benefit of U.S. Provisional Application No. 63/239,770, entitled "NANOCOMPOSITE MEMBRANE, ELECTROLYTE-SEPARATOR COMPOSITE FOR A BATTERY, AND METHOD OF MAKING A NANOCOMPOSITE MEMBRANE," filed Sep. 1, 2021, assigned to the assignee hereof, and expressly incorporated herein by reference in its entirety.

BACKGROUND

Field

Aspects of the present disclosure relate generally to energy storage devices, and more particularly to battery technology and the like. Aspects of the present disclosure relate to flame-retardant and/or heat-resistance nanocomposite membranes and their use as a separator in an electrolyte-separator composite for a battery, a supercapacitor or another energy storage device. Aspects of the present disclosure relate to a method of making a nanocomposite membrane.

Background

As the demand for energy storage continues to surge driven by growth in energy sectors such as portable consumer electronics, electric vehicles and grid energy storage systems, there is an incessant need to improve energy and power densities of lithium-ion batteries (LIBs) without compromising safety. To achieve this target, higher areal loading or higher energy density electrodes are necessary, which often increase mechanical stresses and self-heating and thus associated safety risks of the resultant batteries. Advanced separators, whose primary roles are to enable ion transport and to prevent a short circuit by avoiding a direct electrical contact between the electrodes, can play important roles to both enhance cell power density and improve safety features. The LIB separators must several basic criteria for their use, such as: (a) high open porosity, low tortuosity, and (for applications that use liquid electrolyte) high wettability by liquid electrolyte(s) to facilitate rapid molecule/Li-ion transport, (b) good chemical and electrochemical stability in contact with the electrolyte and electrode materials across an operational potential range (that may result in strong oxidizing and reducing environments during charge/discharge), and (c) strong mechanical stability for materials manufacturing and cell assembly. Indeed, LIB rate performance may be significantly reduced if a separator does not allow fast ion transport at high areal current density, while high separator shrinkage during heating or high-temperature operations may induce formation of internal short-circuits in LIBs. In addition, separators should ideally be flame-retardant to minimize the probability of catastrophic events, such as fire or explosion originating from either a thermal runaway reaction and/or a short-circuit.

Commonly employed LIB separators are manufactured from either polyethylene (PE) or polypropylene (PP), which have their advantages in terms of low cost, excellent electrochemical stability and mechanical strength, but do not meet all of the above requirements. In particular, their poor thermal stability (glass transition temperature ($T_g$) of −110 and −20° C., low melting temperature ($T_m$) of 135 and 170° C., and thermal decomposition temperature ($T_d$) of 325-450° C. and 328-410° C., respectively, for PE and PP separators could result in serious safety issues (e.g., smoke, fire or even explosion) when operated at elevated temperature or under extreme conditions. Moreover, their non-polar chemical structure (dielectric constant value $\varepsilon$=1.6 and 2.1, respectively, for PE and PP), small porosity and high tortuosity lead to the poor electrolyte wettability and low ion conductivity. Although these issues may be somewhat alleviated when the surfaces of PE or PP separators are coated with particulate inorganic materials, such fabrication procedures are complex, costly, increase separator thickness, reduce separator flexibility and processability, often enhance moisture entrapment and offer limited improvements. Furthermore, the potential for substantial polymer swelling and consequent separation of the coating may minimize any advantages gained through complex fabrications. Thus, improved separators based on pure polymer or polymer-ceramic composites based on simpler fabrication methods may be considered.

Among different classes of polymers, polyimides have found increasing attention in various applications due to their good thermal (high $T_g$, $T_m$ and $T_d$ and flame-retardance), mechanical, electrochemical, and wetting (due to polar amide bonds) properties. Their fabrication, however, is often time-consuming and costly.

Accordingly, there remains a need for improved flame-retardant and/or heat-resistant separator membranes for batteries and other related components, materials, and manufacturing processes.

SUMMARY

Embodiments disclosed herein address the above stated needs by providing improved flame-retardant and/or heat-resistant separator membranes for batteries and other related components, materials, and manufacturing processes.

Poor heat/flame-resistance of polyolefin (e.g., polyethylene and polypropylene) separators and high flammability of organic electrolytes used in today's lithium-ion batteries (LIBs) may trigger rare yet potentially catastrophic safety issues. Here, a heat-resistant and flame-retardant porous composite membrane comprises polyetherimide (PEI) (among other suitable polymers) and ceramic (e.g., metal oxide or metal fluoride or metal oxy-fluoride or metal hydroxide or metal oxy-hydroxide) (where metal is Al, Mg, Si or others, such as $Al_2O_3$ in an illustrative example) nanowires or nanofibers (among other types of suitable ceramic or polymer nanofibers). In some designs, such membranes are fabricated based on a non-solvent-induced phase separation process, which may result in an intimately interconnected porous network of $Al_2O_3$ and PEI. In some designs, the produced composite membranes exhibit excellent flexibility, thermal stability and flame-retardancy. Importantly, in some designs, the composite membranes exhibit a minimal thermal shrinkage and superior tensile strength at high temperatures, significantly exceeding performance of conventional polyolefin separators. In some designs, such membranes may exhibit excellent wettability, high ionic conductivity, high electrolyte uptake wt. %, as well as superior cycle and rate performance demonstrated in lithium ion batteries, which may make such membranes attractive choices for a variety of electrochemical energy storage devices.

In some designs, a simple, convenient, and scalable fabrication procedure of polyetherimide (PEI)-ceramic NWs based separators via nonsolvent-induced phase separation (NIPS) method is demonstrated by employing a pore-forming hydrophilic additive, such as polyvinyl pyrrolidone (PVP) in one illustrative example. The impact of different ceramic filler content on the morphological, electrochemical, thermal, and mechanical properties of the separators have been systematically investigated. Their electrochemical performances and physical properties exceed those of standard PP or PE separators substantially. Other polymers and hydrophilic pore-forming (pore-enhancing) additives are also disclosed.

In one aspect, a nanocomposite membrane includes a polymer phase, a nanowire phase, and a pore phase. In some designs, the polymer phase may include a polymer including a cyclic imide group. The nanowire phase may include metal oxide nanowires or nanofibers. In some designs, polymer nanofibers may be favorably used in combination with metal oxide nanofibers. In some designs, larger metal oxide fibers or larger polymer fibers (e.g., near or larger than 1 micron in diameter) may be used in combination with metal oxide nanowires. In some designs, each of the polymer phase and the nanowire phase is uniformly distributed throughout (e.g., within) at least part (e.g., some or all) of the nanocomposite membrane. To be specific, in some designs, it may be advantageous for the standard deviation of the weight fraction of metal oxide nanofibers (e.g., relative to the polymer) in fifty (50) randomly selected $5 \times 5$ mm$^2$ membrane samples to be below about 20% of the mean value; in some designs, below about 10% of the mean value; in some designs— below about 5% of the mean value; in some designs—below about 2% of the mean value.

In some designs, the pore phase may also be uniformly distributed throughout (e.g., within) at least part (e.g., some or all) of the nanocomposite membrane. To be specific, in some designs, within it may be advantageous for the standard deviation of the pore volume fraction (relative to the total volume of the membrane compressed under the application of 0.1 MPa of the applied uniaxial pressure) of nanocomposite membrane in fifty (50) randomly selected $5 \times 5$ mm$^2$ membrane samples to be below about 20% of the mean value; in some designs, below about 10% of the mean value; in some designs—below about 5% of the mean value; in some designs—below about 2% of the mean value).

In some designs, such nanocomposite membranes may advantageously exhibit a dual pore size distribution, where both smaller pores (e.g., produced by the polymer precipitation) and significantly larger pores (e.g., produced by the pore-forming additive; e.g., 3-100 times bigger than the smaller pores, on average) coexist to provide a combination of good physical properties and high permeability by air and electrolyte.

In another aspect, the nanocomposite membrane may be used as a separator membrane for a battery (e.g., Li-ion or Na-ion or K-ion or other battery types). An electrolyte-separator composite for a battery includes a separator membrane and an electrolyte (e.g., a liquid electrolyte or a solid (such as a polymer or a ceramic) electrolyte) filling at least a fraction of the pore phase of the separator membrane. A battery includes an anode, a cathode, and the electrolyte-separator composite interposed between the anode and the cathode.

In yet another aspect, a method of making a nanocomposite membrane includes the following stages (A1), (A2), (A3), and (A4). Stage (A1) includes mixing a water-insoluble polymer composition, water-soluble pore-forming polymer composition, and metal oxide nanowires in a non-aqueous solvent to form a mixture. The water-insoluble polymer composition and the water-soluble pore-forming polymer composition are dissolved in the non-aqueous solvent. The non-aqueous solvent is chosen to be miscible with water. Stage (A2) includes casting the mixture onto a substrate to form a film. Stage (A3) includes immersing the film in a water bath, such that the water-soluble pore-forming polymer composition and the non-aqueous solvent diffuse from the film into the water bath. Stage (A4) includes drying the film. In some designs, instead of water one may use a second non-aqueous solvent (miscible with the first non-aqueous solvent), which dissolves a pore-forming polymer composition but acts as a nonsolvent for the other polymer composition.

In yet another aspect, the method of making the nanocomposite membrane additionally includes a Stage (B) which is carried out after Stage (A2) and before Stage (A3). Stage (B) includes subjecting the film to a high-humidity environment in a range of about 50% to 100% relative humidity, or in a range of 90% to 99% relative humidity, at a temperature in a range of 25° C. to 100° C., or in a range of around 40° C. to 70° C.

In an aspect, a nanocomposite membrane includes a polymer phase comprising a polymer comprising a cyclic imide group; a nanowire phase comprising metal oxide nanowires; and a pore phase, wherein each of the polymer phase and the nanowire phase is uniformly distributed within at least part of the nanocomposite membrane.

In an aspect, a method of making a nanocomposite membrane includes (A1) mixing a water-insoluble polymer composition, water-soluble pore-forming polymer composition, and metal oxide nanowires in a non-aqueous solvent to form a mixture, the water-insoluble polymer composition and the water-soluble pore-forming polymer composition being dissolved in the non-aqueous solvent, the non-aqueous solvent being miscible with water; (A2) casting the mixture onto a substrate to form a film; (A3) immersing the film in a water bath, such that the water-soluble pore-forming polymer composition and the non-aqueous solvent diffuse from the film into the water bath; and (A4) drying the film.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of embodiments of the disclosure and are provided solely for illustration of the embodiments and not limitation thereof. Unless otherwise stated or implied by context, different hatchings, shadings, and/or fill patterns in the drawings are meant only to draw contrast between different components, elements, features, etc., and are not meant to convey the use of particular materials, colors, or other properties that may be defined outside of the present disclosure for the specific pattern employed.

FIG. 1A shows a first portion of the process including mixing of a mixture and casting of the mixture on a substrate to form a film. FIG. 1B shows a second portion of the process including the out-diffusion of a water-soluble pore-forming polymer (e.g., polyvinylpyrrolidone, abbreviated as PVP) and a non-aqueous solvent (e.g., N-methyl-2-pyrrolidone, abbreviated as NMP).

FIGS. 2A through 2J are scanning electron microscopy (SEM) images of respective PEI-Al$_2$O$_3$ nanowires (NWs) membranes. FIGS. 2A, 2B are SEM images of a "pure PEI" membrane in which the film-forming mixture contained PEI and Al$_2$O$_3$NWs but no water-soluble pore-forming polymer (PVP) (also referred to as PEI membrane, PEI-0, or P0). FIGS. 2C, 2D are SEM images of a PEI-10 membrane in which the film-forming mixture (PEI, Al$_2$O$_3$ NWs, and PVP) contained PVP at a concentration of 10 wt. %. FIGS. 2E, 2F are SEM images of a PEI-20 membrane in which the film-forming mixture contained PVP at a concentration of 20 wt. %. FIGS. 2G, 2H are SEM images of a PEI-30 membrane in which the film-forming mixture contained PVP at a concentration of 30 wt. %. FIGS. 2I, 2J are SEM images of a PEI-40 membrane in which the film-forming mixture contained PVP at a concentration of 40 wt. %. FIGS. 2A, 2C, 2E, 2G, and 2I are plan view SEM images of the respective membranes. FIGS. 2B, 2D, 2F, 2H, and 2J are cross-sectional view SEM images of the respective membranes. FIGS. 2K, 2L, 2M, and 2N, are EDX elemental maps of Al, C, O, and N, respectively, for the PEI-30 membrane. FIGS. 2O, 2P are digital camera images of PEI-30 membrane undergoing folding and rolling, respectively.

FIGS. 3E, 3F show contact angle measurements at 2 sec and 90 sec, respectively, after dropping the liquid electrolyte on a surface of a polypropylene (PP) separator membrane. FIGS. 3G, 3H show contact angle measurements at 2 sec and 5 sec, respectively, after dropping the liquid electrolyte on a surface of a P30 separator membrane.

FIGS. 5A through 5F show electrochemical performance-related data of polypropylene (PP) and P30 separator membranes. FIG. 5A shows the temperature dependence of ionic conductivity. FIG. 5B shows cyclic voltammetry curves of SS|P30|Li and SS|PP|Li cells (SS is stainless steel). FIGS. 5C, 5D show cycling performance of NCM811|PP|Li and NCM811|P30|Li cells (NCM811 is a lithium intercalation cathode material with approximate composition of LiNi$_{0.8}$Co$_{0.1}$Mn$_{0.1}$O$_2$) at a current rate of 0.33 C operated in the potential range of (FIG. 5C) 2.8-4.4 V and (FIG. 5D) 2.8-4.2 V, respectively (a current rate of 0.1 C was used for the first two cycles). FIG. 5E shows voltage profiles of NCM811|PP|Li and NCM811|P30|Li cells at cycles 3, 50, and 100. FIG. 5F shows rate performance of NCM811|PP|Li and NCM811|P30|Li cells at different current densities (1 C=190 mA g$^{-1}$).

FIGS. 6A, 6B, and 6C are digital camera image, SEM image, and XRD pattern of commercial Al$_2$O$_3$NWs, respectively.

FIGS. 9A through 9H are SEM images of PEI-30 wt. % Al$_2$O$_3$NWs membranes of respective PVP concentrations: FIGS. 9A, 9B show 70 wt. % PEI-30 wt. % Al$_2$O$_3$NWs membrane; FIGS. 9C, 9D show 60 wt. % PEI-10 wt. % PVP-30 wt. % Al$_2$O$_3$NWs membrane; FIGS. 9E, 9F show 45 wt. % PEI-25 wt. % PVP-30 wt. % Al$_2$O$_3$NWs membrane; and FIGS. 9G, 9H show 30 wt. % PEI-40 wt. % PVP-30 wt. % Al$_2$O$_3$NWs membrane. FIGS. 9A, 9C, 9E, and 9G are SEM images of the top surfaces of the respective membranes. FIGS. 9B, 9D, 9F, and 9H are SEM images of the bottom surfaces of the respective membranes. FIG. 9I shows the Gurley number of the membranes of the foregoing compositions.

FIG. 14 shows Nyquist plots of polypropylene (PP), P10, P20, P30, and P40 separator membranes.

FIGS. 19A, 19B show results for a PP separator membrane. FIGS. 19C, 19D show results for a P30 separator membrane.

FIGS. 24 and 25 illustrate example polymers used in some embodiments of the present disclosure.

FIG. 26 depicts a table that includes Hansen solubility parameters (HSPs) associated with N-methyl-2-pyrrolidone (NMP) and water.

FIG. 27 depicts a table that includes compositions, physical and chemical properties of a series of several exemplary separators.

FIG. 28 depicts a table that shows the tensile properties of pure PEI and PEI-Al$_2$O$_3$NWs separators.

DETAILED DESCRIPTION

Figures 1A, 1B:
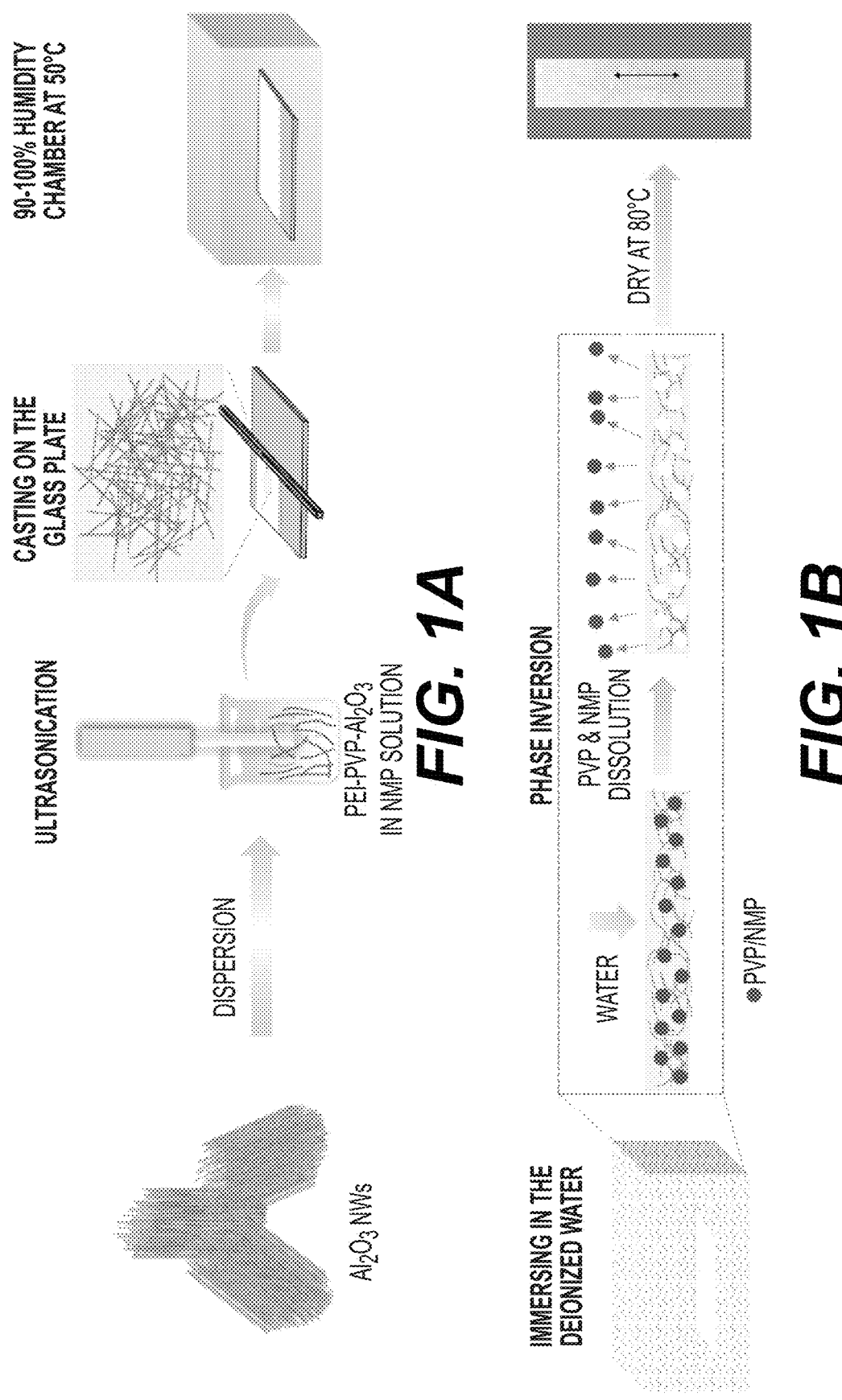
FIGS. 1A-1B are schematic diagrams of example stages in a method of forming a nanocomposite membrane using a non-solvent induced phase separation process (NIPS).

Aspects of the present invention are disclosed in the following description and related drawings directed to specific embodiments of the invention. The term "embodiments of the invention" does not require that all embodiments of the invention include the discussed feature, advantage, process, or mode of operation, and alternative embodiments may be devised without departing from the scope of the invention. Additionally, well-known elements of the invention may not be described in detail or may be omitted so as not to obscure other, more relevant details.

Any numerical range described herein with respect to any embodiment of the present invention is intended not only to define the upper and lower bounds of the associated numerical range, but also as an implicit disclosure of each discrete value within that range in units or increments that are consistent with the level of precision by which the upper and lower bounds are characterized. For example, a numerical distance range from 7 nm to 20 nm (i.e., a level of precision in units or increments of ones) encompasses (in nm) a set of [7, 8, 9, 10, . . . , 19, 20], as if the intervening numbers 8 through 19 in units or increments of ones were expressly disclosed. In another example, a temperature range from about −120° C. to about −60° C. encompasses (in ° C.) a set of temperature ranges from about −120° C. to about −119° C., from about −119° C. to about −118° C., . . . from about −61° C. to about −60° C., as if the intervening numbers (in ° C.) between −120° C. and −60° C. in incremental ranges were expressly disclosed. In yet another example, a numerical percentage range from 30.92% to 47.44% (i.e., a level of precision in units or increments of hundredths) encompasses (in %) a set of [30.92, 30.93, 30.94, . . . , 47.43, 47.44], as if the intervening numbers between 30.92 and 47.44 in units or increments of hundredths were expressly disclosed. Hence, any of the intervening numbers encompassed by any disclosed numerical range are intended to be interpreted as if those intervening numbers had been disclosed expressly, and any such intervening number may thereby constitute its own upper and/or lower bound of a sub-range that falls inside of the broader range. Each sub-range (e.g., each range that includes at least one intervening number from the broader range as an upper and/or lower bound) is thereby intended to be interpreted as being implicitly disclosed by virtue of the express disclosure of the broader range. In yet another example, a numerical range with upper and lower bounds defined at different levels of precision shall be interpreted in increments corresponding to the bound with the higher level of precision. For example, a numerical percentage range from 30.92% to 47.4% (i.e., levels of precision in units or increments of hundredths and tenths, respectively) encompasses (in %) a set of [30.92, 30.93, 30.94, . . . , 47.39, 47.40], as if 47.4% (tenths) was recited as 47.40% (hundredths) and as if the intervening numbers between 30.92 and 47.40 in units or increments of hundredths were expressly disclosed.

It will be appreciated that the level of precision of any particular measurement, threshold or other inexact parameter may vary based on various factors such as measurement instrumentation, environmental conditions, and so on. Below, reference to such measurements or thresholds may thereby be interpreted as a respective value assuming a pseudo-exact level of precision (e.g., a threshold of 80% comprises 80.0000 . . . %). Alternatively, reference to such measurements or thresholds may be described via a qualifier that captures pseudo-exact value(s) plus a range that extends above and/or below the pseudo-exact value(s). For example, the above-noted threshold of 80% may be interpreted as "about", "approximately", "around" or "~" 80%, which encompasses "exactly" 80% (e.g., 80.0000 . . . %) plus some range around 80%. In some designs, the range encompassed around a measurement or threshold via the "about", "approximately", "around" or "~" qualifier may encompass the level of precision for which the respective measurement or threshold is capable of being measured by the most accurate commercially available instrumentation as of the priority date of the subject application.

While the description below may describe certain examples in the context of Li metal and Li-ion batteries (for brevity and convenience, and because of the current popularity of Li technology), it will be appreciated that various aspects may be applicable to other rechargeable and primary batteries (such as Na and Na-ion, Mg and Mg-ion, K and K-ion, Ca and Ca-ion, and other metal and metal-ion batteries, etc.).

While the description below may describe certain examples in the context of metal oxide nanowires or nanofibers or fibers, it will be appreciated that various aspects may be applicable to metal fluoride, metal oxy-fluoride, metal hydroxide, metal oxy-hydroxide and other ceramic nanowires or nanofibers or fibers.

While the description below may describe certain examples of aluminum (Al)-based ceramic nanowires or nanofibers or fibers (e.g., Al$_2$O$_3$ or AlO(OH) or Al(OH)3), it will be appreciated that metals other than Al or their various combinations (incl. various combinations with Al) may be used for the formation of such ceramic nanowires or nanofibers or fibers (e.g., silicon—Si, magnesium—Mg, niobium—Nb, lithium—Li, sodium—Na, potassium—K, calcium—Ca, zinc—Zn, etc.). In some designs, more than one metal may be utilized in the ceramic nanowires or nanofibers or fibers. The optimum ceramic composition may be affected by the desired mechanical, physical, chemical and electrochemical stability properties needed for a given application and a given battery electrode chemistry. For example, ceramic fibers are used in a separator for a LIB with a low-potential anode (e.g., Li metal anode or graphite anode or Si-based anode), it is important that there would be a low probability for these to get electrochemically reduced during LIB operation and so their composition and distribution within a membrane may be selected accordingly. In some designs, for example, a portion of the composite membrane (e.g., about 0.1-5.0 micron) in contact with an anode may not comprise any ceramic nanowires or nanofibers or fibers in order to prevent their electrochemical reduction.

While the description below may also describe certain examples of the electrode material formulations in a Li-free state (for example, as in silicon-comprising nanocomposite anodes or metal fluoride cathodes), it will be appreciated that various aspects may be applicable to Li-containing electrodes and active materials (for example, partially or fully lithiated Si-comprising anodes or partially or fully lithiated Si-comprising anode particles, partially or fully lithiated metal fluoride comprising cathodes (such as a mixture of LiF and metals such as Cu, Fe, Ni, Bi, and various other metals and metal alloys and mixtures of such and other metals, etc.) or partially or fully lithiated metal halide comprising cathode particles, partially or fully lithiated chalcogenides (such as $Li_2S$, $Li_2S$/metal mixtures, $Li_2Se$, $Li_2Se$/metal mixtures, $Li_2S$—$Li_2Se$ mixtures, various other compositions comprising lithiated chalcogenides etc.), partially or fully lithiated metal oxides (such as $Li_2O$, $Li_2O$/metal mixtures, etc.), partially or fully lithiated carbons, among others).

While the description below may describe certain examples in the context of some specific alloying-type and conversion-type chemistries of anode and cathode active materials for Li-ion batteries (such as silicon-comprising anodes or metal fluoride-comprising or lithium sulfide-comprising cathodes), it will be appreciated that various aspects may be applicable to other chemistries for Li-ion batteries (other conversion-type and alloying-type electrodes as well as various intercalation-type anodes and cathodes) as well as to other battery chemistries. In the case of metal-ion batteries (such as Li-ion batteries), examples of other suitable conversion-type electrodes include, but are not limited to, metal fluorides, metal chlorides, metal iodides, metal bromides, sulfur, metal sulfides (including, but not limited to lithium sulfide), selenium, metal selenide (including, but not limited to lithium sulfide), metal oxides, metal nitrides, metal phosphides, metal hydrides, their various mixtures, composites (including nanocomposites) and alloys and others.

During battery (such as a Li-ion battery) operation, conversion materials change (convert) from one crystal structure to another (hence the name "conversion"-type). This process is also accompanied by breaking chemical bonds and forming new ones. During (e.g., Li-ion) battery operation, Li ions are inserted into alloying type materials forming lithium alloys (hence the name "alloying"-type). Sometimes, "alloying"-type electrode materials are considered to be a sub-class of "conversion"-type electrode materials.

While the description below may describe certain examples of suitable intercalation-type cathodes (including high voltage cathodes) in the context of lithium nickel cobalt aluminum oxides (NCA), lithium nickel cobalt manganese aluminum oxides (NCMA), lithium nickel oxides (LNO), lithium manganese oxides (LMO), lithium nickel manganese cobalt oxides (NCM), lithium cobalt oxide (LCO), lithium cobalt aluminum oxides (LCAO), lithium manganese phosphate (LMP), lithium iron phosphate (LFP), lithium manganese iron phosphate (LMFP), lithium cobalt phosphate (LCP) and other lithium transition metal (TM) oxide or phosphate or sulfate (or mixed) cathodes that rely on the intercalation of lithium (Li) and changes in the TM oxidation state (including, but not limited to those that may be doped or heavily doped; including, but not limited to those that have gradient in composition or core-shell morphology; including, but not limited to those that may be partially fluorinated or comprise some meaningful fraction of fluorine (e.g., about 0.001-10 at. %) in their composition, etc.), it will be appreciated that various aspects may be applicable to high-voltage lithium transition metal oxide (or phosphate or sulfate or mixed or other) cathodes where TMs and oxygen (O) are covalently bonded and both TM and O take part in electrochemical reduction-oxidation (redox) reactions during charge and discharge (including, but not limited to, those oxides or phosphate or sulfate or mixed cathodes that may comprise at least about 0.25 at. % of Mn, Fe, Ni, Co, Nb, Mg, Cr, Mo, Zr, W, Ta, Ti, Hf, Y, La, Sb, Sn, Si, or Ge).

While the description below may describe certain examples in the context of aluminum oxide (e.g., $Al_2O_3$) ceramic filler material, it will be appreciated that oxides of other metals or semimetals (e.g., Mg, K, Na, Ca, Li, Fe, Zr, Si, Ba, Zn, La, Y, Ta, W, Mo, Ti, Hf, etc.) or their various combinations may be utilized in some membrane (e.g., separator) designs.

While the description below may describe certain filler examples (e.g., nanofiber, fiber, flakes, dendritic particles, etc.) in the context of metal oxide ceramic materials, it will be appreciated that oxy-fluorides, oxy-nitrides, sulfides, oxy-nitrides, carbides, oxy-carbides, and other ceramic materials may also be used in some designs.

In some designs, the composition of the ceramic material may be selected to be electrochemically stable within the potential window of anode or cathode (or both) operation.

As used herein, elongated particles (such as dense and porous nanofibers, nanowires, whiskers, nanotubes, nanoribbons, etc.) of suitable size (e.g., diameter [or, more generally, average cross-sectional dimensions in the direction perpendicular to the elongation direction] from around 1.0 nm to around 950.0 nm), shape, aspect ratios, density, porosity, crystal structure, and morphology may be generally referred to herein as either "nanofibers" or "nanowires".

While the description below may describe certain examples in the context of solid or porous ceramic nanowires (or nanofibers), it will be appreciated that other shapes of solid or porous ceramic materials (e.g., dendritic particles and nanoparticles; branched fibers or nanofibers; flakes or nanoflakes; etc.) and their various combinations may be utilized in some membrane designs.

While the description below may describe certain examples in the context of one type of ceramic nanowire (or nanofiber) composition, it will be appreciated that two, three or more distinctly different nanowire (or nanofiber) compositions may be advantageously used in some designs. It may be, in fact, advantageous to combine nanowires (or nanofibers) having different dimensions (e.g., use larger diameter and longer dimensions nanofibers or fibers for enhanced dimensional stability and mechanical properties in combination with smaller diameter and shorter nanofibers for templating smaller pores, etc.). In some designs, the nanowires or nanofibers having different dimensions or composition, may also exhibit different chemical formula or microstructure or aspect ratio or roughness or porosity or other chemical or physical properties or belong to entirely different class of materials (e.g., one being a ceramic and another being a polymer or a polymer composite).

While the description below may describe certain examples in the context of ceramic nanowire (or nanofiber)

compositions, it will be appreciated that polymer nanofibers or fibers (or more broadly, polymer-containing nanofibers or fibers) may be used in some designs. In some designs, ceramic (e.g., metal oxide) nanofibers or fibers may also be advantageously used in combination with polymer nanofibers or fibers. Such polymer fibers or nanofibers (used in standalone or in combination with ceramic fibers or nanofibers) may exhibit sufficiently good (for a given application) mechanical and thermal properties, high flexibility, low density, easy processability and low cost, which may be advantageous in some designs. In some designs, such polymers nanofibers or fibers may be branched or dendritic. In some designs, such polymer nanofibers or fibers may be interconnected. In some designs, such polymer nanofibers or fibers may exhibit very good thermal stability properties (e.g., a melting point (or a melt flow temperature) of more than ~150° C.; in some designs in excess of ~200° C.; in some designs in excess of ~250° C.; in some designs in excess of ~300° C.; in some designs in excess of ~400° C.; in some designs in excess of ~500° C.; or a decomposition temperature of more than ~300° C.; in some designs in excess of ~400° C.; in some designs in excess of ~500° C.; or ability to maintain the chemical characteristics of the polymer at above around 300° C. by thermogravimetric analysis (TGA) in air; in some designs in excess of ~350° C.; in some designs in excess of ~400° C.). In some designs such polymer fibers or nanofibers may exhibit a continuous use temperature in excess of about 150° C. (in some designs—in excess of about 200° C.; in other designs—in excess of about 250° C. In some designs, such polymer fibers or nanofibers may be thermoset. In some designs, such polymer fibers or nanofibers may be thermoplastic. In some designs, such polymer fibers or nanofibers may be semi-crystalline or crystalline. In some designs, such polymer fibers or nanofibers may be amorphous. In some designs, such polymers nanofibers or fibers may comprise phosphorus (P) in their composition. In some designs, such polymers nanofibers or fibers may comprise nitrogen (N) in their composition. In some designs, such polymers nanofibers or fibers may comprise bromine (Br) in their composition. In some designs, such polymer nanofibers or fibers may comprise fluorine (F) in their composition.

Examples of suitable polymer compositions for the formation of such fibers or nanofibers may include, but are not limited to cellulose, polyphosphazenes, polyimides (PI), polyamides (PA), polyamides-imides (PAI), aramids, nylon, polytetrafluoroethylene, polyquinolines, poly(2,2'-(m-phenylene)-5,5'-bibenzimidazole) (PBI), polyacrylonitrile (PAN), poly(vinyl chloride) (PVC), polyethersulfone (PES), polyetherimide (PEI), polysulfone (PSF), polyetheretherketone (PEEK), polyphthalamide (PPA), polyphenylene sulfide (PPS), polyphenylene sulfone (PPSU), high temperature sulfone (HTS), self-reinforced polyphenylene ether (SRP), thermoplastic polyimide (TPI), polyaryletherketone (PAEK), perfluorosulfonic acid (PFSA), liquid crystal polymers (LCP), poly-ε-caprolactam (PA-6), and others.

Depending on the application, in an example, the suitable true density (taking into consideration closed porosity) of nanofibers (or nanowires) may range from around 0.3 to around 4 g/cm³ (e.g., for ceramic particles comprising only Al metal in their composition) and to around 6 g/cm³ (e.g., for particles comprising metals other than Al in their composition) in the context of one or more embodiments of the present description. Depending on the application and the processing conditions, in an example, the suitable pore volume (e.g., open pore volume) within individual fibers or nanofibers may range from around 0 to around 5 cm³/g (e.g., in some designs, from around 0.01 cm³/g to around 3 cm³/g; in some designs, from around 0.05 cm³/g to around 1 cm³/g). Depending on the application and the processing conditions, in an example, the microstructure may range from amorphous to nanocrystalline to polycrystalline to single crystalline to a mixture of those to other types. Depending on the application and processing conditions, in an example, the suitable surface roughness of the nanofibers may range from around 0 nm to around 100 nm.

Depending on the application, in an example, the suitable Brunauer-Emmett-Teller (BET) specific surface area (SSA) of the nanowires/nanofibers may range from around 2.0 m²/g to around 4000.0 m²/g. In some designs, the optimal range may depend on the specific membrane composition, properties of fibers/nanowires/nanofibers (such as composition, morphology, crystal structure, porosity, etc.), desired mechanical properties of the membrane required for battery cell assembling or safe cell operation, among other factors. In some designs, the optimal BET SSA may range, for example, from around 2.0 m²/g to around 50.0 m²/g; from around 50.0 m²/g to around 100.0 m²/g; from around 100.0 m²/g to around 250.0 m²/g; from around 250.0 m²/g to around 500.0 m²/g; from around 500.0 m²/g to around 1000.0 m²/g, or from around 1000.0 m²/g to around 4000.0 m²/g.

In one or more embodiments of the present disclosure, the suitable diameter (or width) of individual nanowires/nanofibers/fibers (of various compositions) may range from around 1 nm to around 500 nm, in some designs, from around 5.0 nm to around 500.0 nm and the suitable length of individual small fibers (of various compositions) may range from around 50.0 nm to around 5 mm (in some designs, an average length may range from around 250 nm to around 500 μm; in other designs an average length may range from around 50 nm to around 2.5 micron; in other designs an average length may range from around 2.5 micron to around 25 micron; in yet other designs an average length may range from around 25 micron to around 100 micron; in yet other designs an average length may range from around 100 micron to around 5 mm).

In one or more embodiments of the present disclosure, the suitable aspect ratio (width-to-length) of individual small fibers (of various compositions) may preferably range from around 1:10 to around 1:1,000,000 (in some designs, from around 1:10 to around 1:100,000; in some designs, from around 1:10 to around 1:100; in other designs from around 1:100 to around 1:1,000; in other designs from around 1:100 to around 10,000; in other designs from around 1:1,000 to around 10,000; in other designs from around 1:10,000 to around 1:100,000, in other designs from around 100,000 to around 1,000,000). Too high aspect ratio may make it difficult for the nanofibers to be properly dispersed in a slurry formulation, while too low aspect ratio may make them less effective. In some designs, an aspect ratio in the range from around 1:10 to around 1:100,000 (in some designs, from around 1:100 to around 1:10,000) may be advantageously used.

In some designs and applications, the individual nanofibers may be agglomerated into bundles or into flexible threads or into flexible yarns and may be parts of the final membrane composition.

In the context of one or more embodiments of the present description, the term "dispersion" refers to a mixture of solid(s) and liquid(s) whereas the solid(s) interact(s) with the liquid(s) in a way which changes the fluid properties of both the solid(s) and liquid(s). For example, solid (nano)particles of various shapes and sizes may be dispersed in a liquid causing the viscosity of the liquid to increase and the Brownian motion of the particles to increase. The term "dispersion" may further refer to the condition where solid (nano)particles of various shapes and sizes are being suspended in a liquid (solvent). In the context of one or more embodiments of the present description, the term "stable dispersion" refers to the conditions where particles (such as fibers, flakes, nanoparticles or particles of various other shapes and sizes) remain suspended for a timescale that is sufficient for a given processing stage (e.g., such as casting the dispersion into a film on a substrate, etc.).

Figure 21:
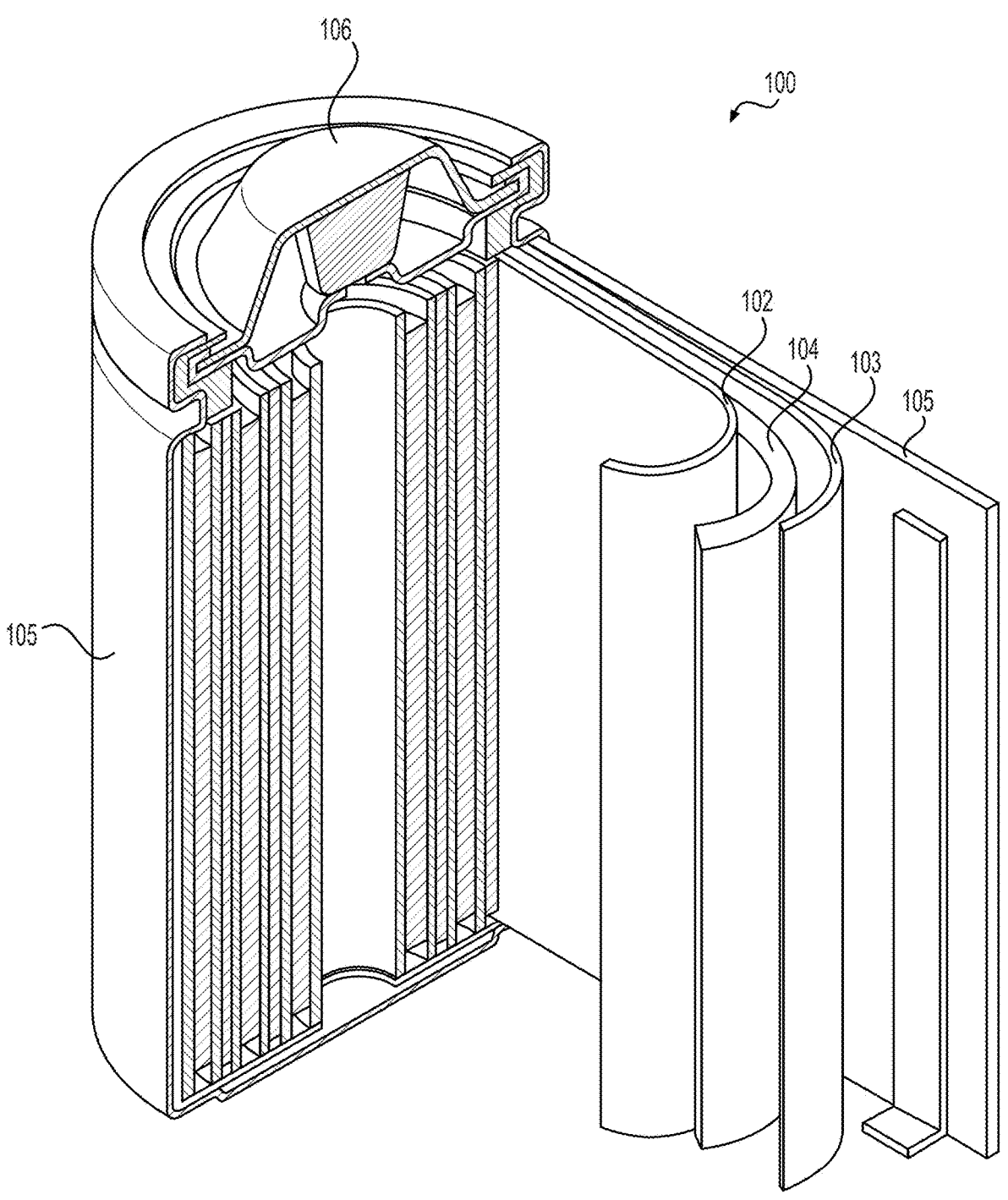
FIG. 21 illustrates an example Li-ion battery in which the components, materials, methods, and other techniques described herein may be implemented.

FIG. 21 illustrates an example metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 100 includes a negative anode 102, a positive cathode 103, a separator 104 interposed between the anode 102 and the cathode 103, an electrolyte (shown implicitly) impregnating the separator 104, a battery case 105, and a sealing member 106 sealing the battery case 105.

Conventional electrolytes for Li- or Na-based batteries of this type are generally composed of an about 0.8-1.2 M (about 1M±about 0.2 M) solution of a single Li or Na salt (such as $LiPF_6$ for Li-ion batteries and $NaPF_6$ or $NaClO_4$ salts for Na-ion batteries) in a mixture of carbonate solvents with about 1-2 wt. % of other organic additives. Common organic additives may include nitriles, esters, sulfones, sulfoxides, phosphorous-based solvents, silicon-based solvents, ethers, ketones, boron-based compounds, and others. Such additive solvents may be modified (e.g., sulfonated or fluorinated). Higher (e.g., 1.2-4 M) or lower (e.g., 0.1-0.8 M) salt concentration may be used in some electrolyte designs in the context of the present disclosure. Furthermore, two, three or more different salts may be used in some electrolyte designs in the context of the present disclosure. In some designs, the main electrolyte solvents may not be carbonates, but be esters, ethers, sulfones, ketones or others. In some designs, electrolytes may also comprise ionic liquids (ILs).

The conventional salt used in most conventional Li-ion battery electrolytes is $LiPF_6$. Examples of less common salts (e.g., explored primarily in research publications or, in some cases, never even described in Li-ion battery electrolyte applications, but may still be applicable and useful) include: lithium tetrafluoroborate ($LiBF_4$), lithium perchlorate ($LiClO_4$), lithium hexafluoroantimonate ($LiSbF_6$), lithium hexafluorosilicate ($Li_2SiF_6$), lithium hexafluoroaluminate ($Li_3AlF_6$), lithium bis(oxalato)borate ($LiB(C_2O_4)_2$), lithium difluoro(oxalate)borate ($LiBF_2(C_2O_4)$), various lithium imides (such as $SO_2FN^-(Li^+)SO_2F$, $CF_3SO_2N^-(Li^+)SO_2CF_3$, $CF_3CF_2SO_2N^-(Li^+)SO_2CF_3$, $CF_3CF_2SO_2N^-(Li^+)SO_2CF_2CF_3$, $CF_3SO_2N^-(Li^+)SO_2CF_2OCF_3$, $CF_3OCF_2SO_2N^-(Li^+)SO_2CF_2OCF_3$, $C_6F_5SO_2N^-(Li^+)SO_2CF_3$, $C_6F_5SO_2N^-(Li^+)SO_2C_6F_5$ or $CF_3SO_2N^-(Li^+)SO_2PhCF_3$, and others), lithium difluorophosphate, and others.

Electrodes utilized in Li-ion batteries are typically produced by (i) formation of a slurry comprising active materials, conductive additives, binder solutions and, in some cases, surfactant or other functional additives; (ii) casting the slurry onto a metal foil (e.g., Cu foil for most anodes and Al foil for most cathodes); and (iii) drying the casted electrodes to completely evaporate the solvent.

Conventional anode materials utilized in Li-ion batteries are of an intercalation-type. Metal ions are intercalated into and occupy interstitial positions of such materials during the charge or discharge of a battery. Such anodes experience small or very small volume changes when used in electrodes. Polyvinylidene fluoride, or polyvinylidene difluoride (PVDF), various salts of carboxymethyl cellulose (CMC), various salts of polyacrylic acid (PAA) are some of the most common binders that are often used in these electrodes. Carbon black is the most common conductive additive used in these electrodes. However, such anodes exhibit relatively small gravimetric and volumetric capacities (typically less than about 370 mAh/g rechargeable specific capacity in the case of graphite- or hard carbon-based anodes and less than about 600 $mAh/cm^3$ rechargeable volumetric capacity at the electrode level without considering the volume of the current collector foils).

Alloying-type (or, more broadly, conversion-type) anode materials for use in Li-ion batteries offer higher gravimetric and volumetric capacities compared to intercalation-type anodes. For example, Earth-abundant silicon (Si) offers approximately 10 times higher gravimetric capacity and approximately 3 times higher volumetric capacity compared to an intercalation-type graphite (or graphite-like) anode. However, Si suffers from significant volume expansion during Li insertion (up to approximately 300 vol. %) and thus may induce thickness changes and mechanical failure of Si-comprising anodes. In addition, Si (and some Li—Si alloy compounds that may form during lithiation of Si) suffer from relatively low electrical conductivity and relatively low ionic (Li-ion) conductivity. Electronic and ionic conductivity of Si is lower than that of graphite. Formation of (nano)composite Si-comprising particles (including, but not limited to Si-carbon composites, Si-metal composites, Si-polymer composites, Si-ceramic composites, composites comprising various combinations of nanostructured Si, carbon, polymer, ceramic and metal or other types of porous composites comprising nanostructured Si or nanostructured or nano-sized Si particles of various shapes and forms) may reduce volume changes during Li-ion insertion and extraction, which, in turn, may lead to better cycle stability in rechargeable Li-ion cells. In some designs, Si may be doped or heavily doped with nitrogen (N), phosphorous (P), boron (B) or other elements or be allowed with metals. In addition to Si-based composites, silicon oxides ($SiO_x$) or oxynitrides ($SiO_xN_y$) or nitrides ($SiN_y$) or other Si element-comprising particles (including those that are partially reduced by Li or Mg) may reduce volume changes and improve cycle stability, although commonly at the expense of higher first cycle losses or faster degradation or both. In some designs, Si-comprising anode particles may exhibit high gravimetric capacities in the range from about 800 mAh/g to about 3000 mAh/g (per mass of Si-comprising anode particles in a Li-free state). Such high specific capacity is advantageous for attaining lighter batteries. However, Li-ion battery cells with anodes comprising high capacity anode particles may exhibit undesirably fast degradation in conventional electrolytes, particularly at elevated temperatures or when charged to high voltages (e.g., above about 4-4.3 V). A subset of anodes with Si-comprising anode particles includes anodes with the electrode layer exhibiting capacity in the range from about 400 mAh/g to about 2800 mAh/g (per mass of the electrode layer, not counting the mass of the current collector, in a Li-free state). Such a class of charge-storing anodes offer great potential for increasing gravimetric and volumetric energy of rechargeable batteries. In addition to Si-comprising anodes, other examples of such high capacity (e.g., nanocomposite) anodes comprising alloying-type (or, more broadly, conversion-type) active materials include, but are not limited to, those that comprise germanium, antimony, aluminum, magnesium, zinc, gallium, arsenic, phosphorous, silver, cadmium, indium, tin, lead, bismuth, their alloys, and others. In addition to anodes comprising active materials in the metallic form, other interesting types of high capacity (including nanocomposite) anodes may comprise metal oxides (including silicon oxide, lithium oxide, etc.), metal nitrides (including silicon nitride, etc.), metal oxy-nitrides (including silicon oxy-nitride, etc.), metal phosphides (including lithium phosphide), metal hydrides, and others.

Li-ion cells with alloying-type (or, more broadly, conversion-type) active anode materials may exhibit undesirably fast degradation, particularly at elevated temperatures or when charged to high voltages (e.g., above about 4-4.3 V) and stored at such voltages at elevated temperatures (e.g., above about 50-80° C.). In some designs, degradation of Li-ion cells with alloying-type (or, more broadly, conversion-type) active anode materials may become particularly undesirably fast for large cells (e.g., cells with cell capacity in the range from about 10 Ah to about 40 Ah) or ultra-large cells (e.g., cells with cell capacity in the range from about 40 Ah to about 400 Ah) or gigantic cells (e.g., cells with cell capacity in the range from about 400 Ah to about 4,000 Ah or even more). However, large, or ultra-large or gigantic cells may be particularly attractive for use in some electric transportation or grid storage applications. In some designs, degradation of Li-ion cells with alloying-type (or, more broadly, conversion-type) active anode materials may become particularly undesirably fast for cells comprising medium (e.g., about 3-4 g/Ah) or small (e.g., about 2-3 g/Ah) amount of electrolyte when normalized by total cell capacity. However, using medium or small amount of electrolyte may be particularly attractive for reducing cell fabrication costs or certain side reactions and for maximizing energy density of cells. One or more aspects of the present disclosure enables one to mitigate or overcome some or all of such limitations and substantially enhance performance of such Li-ion cells by using separator membranes with high pore volume that may house a high total amount of electrolyte additives, which may stabilize performance of such Li-ion cells.

High-capacity (nano)composite anode powders (including, but not limited to those that comprise Si), which exhibit moderately high volume changes (e.g., about 8-about 180 vol. %) during the first charge-discharge cycle, moderate volume changes (e.g., about 4-about 50 vol. %) during the subsequent charge-discharge cycles and an average size in the range from about 0.2 to about 40 microns (for some applications, more preferably from about 0.4 to about 20 microns) may be particularly attractive for battery applications in terms of manufacturability and performance characteristics. In particular, a sub-class of such anode powders with specific surface area in the range from about 0.5 m²/g to about 50 m²/g (in some designs, from about 0.5 m²/g to about 2 m²/g; in other designs, from about 2 m²/g to about 12 m²/g; in yet other designs, from about 12 m²/g to about 50 m²/g) may perform particularly well in some embodiments. In some designs, electrodes with electrode areal capacity loading from moderate (e.g., from about 2 to about 4 mAh/cm²) to high (e.g., from about 4 to about 12 mAh/cm²) and ultra-high (above about 12 mAh/cm²) are also particularly attractive for use in cells. In some designs, a near-spherical or a spheroidal or an ellipsoid (inc. oblate spheroid) shape of these composite particles may additionally be very attractive for increasing rate performance and volumetric capacity (density) of the electrodes.

In some designs, a homogeneous dispersion of inorganic (e.g., ceramic) or polymer fillers (e.g., in the form of fibers incl. nanofibers or nanowires or flakes or dendritic or branched particles) in a polymer matrix may enable formation of nanocomposites with intriguing properties.

In one illustrative example, a series of PEI-Al₂O₃NWs porous nanocomposite membranes with tailored porosity and morphology was fabricated by phase inversion technique via modulation of compositions of the starting materials and fabrication conditions. Commercial Al₂O₃ nanowires (Al₂O₃NWs, Alfa Aesar, USA), PEI (General Electric Company) and polyvinylpyrrolidone (PVP, Aladdin, Mw: 10,000 Da) were used as starting materials. The fabrication of PEI-Al₂O₃NWs composite separator was as follows: first, a viscous slurry was prepared by mixing PEI, PVP and Al₂O₃NWs in NMP in a different w/w ratios between PEI, PVP and Al₂O₃ while keeping the NMP amount constant at 18% (w/w). The Al₂O₃ content was varied from 0-40 wt. % based on the total weight of PEI-Al₂O₃ composite membrane. To ensure uniform distribution of the Al₂O₃NWs in the membrane, the viscous slurry was subjected to ultrasonic agitation for 2 min and then stirred for 10 h at 80° C. Then the homogeneous viscous slurry was cast onto a clean glass plate by using doctor blade apparatus with a gap of 100 μm. The cast gelatinous membrane was immediately transferred into a constant temperature and humidity chamber, which was kept at around 50° C. and 95-100% relative humidity for 20 min, in this particular example. Subsequently, the membranes were peeled off from the glass and immersed in a deionized water bath and kept undisturbed for 48 h. At the end of this period, the obtained membranes were dried for 4 h in a vacuum oven at 80° C. for 4 h to afford paper-like flexible PEI-Al₂O₃NWs separators. The detailed composition, physical and chemical properties of a series of as-resulted separators are summarized in the table depicted in FIG. 27. In FIG. 27, McMullin Number ($N_M$)=$\sigma_e/\sigma_c$, where $\sigma_e$ is the ionic conductivity of liquid electrolyte, and $\sigma_c$ is the ionic conductivity of separator filled with liquid electrolyte. In this work, $\sigma_e$=7.55 mS cm⁻¹ for 1M LiPF₆ in EC/DEC=1/1(v/v). Tortuosity ($\tau$)=($N_M$*μ)$^{1/2}$, where μ is the porosity of the membrane. Each data was measured 3 times and was calculated as the average value.

Hitachi SU8010 and SU8230 scanning electron microscopes equipped with an Oxford Instruments Aztec energy dispersive X-ray detector (EDX) were used to image and analyze all microstructures of fabricated membranes. The phase constitutions were identified by X-ray diffractometer using Cu Kα radiation (XO PERT-PRO MPDT, Netherlands). Thermogravimetric analysis (TGA) was conducted on a TGA Q600 analyzer under N₂ atmosphere at a heating rate of 5° C. min⁻¹. Fourier Transform Infrared Spectroscopy (FTIR) was performed with a Thermo Scientific Nicolet iS50 (USA) instrument with an optical velocity of 0.6329 cm s⁻¹ and a resolution of 4 cm⁻¹. The dimensional thermostability (200 to 350° C.) of prepared PEI-Al₂O₃NWs membranes was characterized by storing them at a certain temperature for 1 h. To test mechanical properties, the membranes were manufactured in rectangular shape with dimensions of 5 mm×40 mm. Their tensile properties were tested on a Mark-10 Model 5583 testing machine (USA) at the speed of 1 mm/min. In order to evaluate the wettability of fabricated PEI-Al₂O₃NWs separator with electrolyte, static contact angle and electrolyte spreading tests were conducted. Static contact angle measurements of the membranes were conducted on a drop shape Model 250 goniometer (USA). The electrolyte spreading test was analyzed by adding electrolyte solution onto the membrane surface and observing its diffusion phenomenon. The electrolyte in this example was 1 M LiPF$_6$ in a mixed solvent system comprising ethylene carbonate (EC), dimethyl carbonate (DMC) and ethyl methyl carbonate (EMC) (EC/DMC/EMC, 1:1:1 v/v). The liquid electrolyte uptake (U) of membranes was calculated according to Eq. (1) by measuring the weights of the membranes before (M$_0$) and after immersion (M$_1$) in the liquid electrolyte:

$$U\ (\%)=(M_1-M_0)/M_0\times100\% \qquad (1)$$

The porosity of membranes was measured by immersing the membrane in n-butanol for 10 h. The porosity was calculated following Eq. (2):

$$\text{Porosity }(\%)=(m_1/\rho_1)/(m_1/\rho_1+m_2/\rho_2)\times100\% \qquad (2)$$

where the m$_1$ and m$_2$ are the weights of dry and n-butanol-saturated membranes, respectively, and ρ$_1$ and ρ$_2$ are the densities of polymer and n-butanol (0.81 g/cm$^3$) respectively. Gurley value was examined using a home-made instrument by measuring the time for a certain volume of air (100 mL) to pass through a fixed area (19.6 cm$^2$) under 0.02 MPa pressure.

In an aspect, the electrolyte used to characterize the electrolyte uptake of an electrolyte-separator composite need not be the electrolyte that is actually used in a respective battery cell. Rather, in some designs, the electrolyte used to determine the electrolyte uptake may be characterized herein as a "reference" electrolyte (e.g., a liquid electrolyte which may be the same or different than the electrolyte used in the respective battery cell). In some designs, the electrolyte uptake of the electrolyte-separator composite is 100 wt. % or greater. In some designs, the reference electrolyte comprises LiPF$_6$ and a solvent mixture, the LiPF$_6$ being present at a concentration of around 1 M or above, the solvent mixture comprising one or more of the following solvents: ethylene carbonate (EC), dimethyl carbonate (DMC), and ethyl methyl carbonate (EMC). In the electrolyte uptake experimental results as described herein, the following reference electrolyte was used: the electrolyte contained LiPF$_6$ at a concentration of about 1 M in a solvent mixture containing ethylene carbonate (EC), dimethyl carbonate (DMC), and ethyl methyl carbonate (EMC) in a 1:1:1 volume ratio.

Example coin cells of 2032-type were assembled using NCM811 as the cathode, lithium metal as counter and reference electrodes and P30 membrane as the separator. For comparison, the polypropylene membrane (2400 type, Celgard, USA) was also assembled under the identical condition. In order to evaluate the ionic conductivity (σ) of membranes, the bulk impedance (R$_b$) of a membrane was measured on a Gamry Potentiostat (Gamry Instruments, USA) by sandwiching the electrolyte-soaked membrane between two stainless steel (SS) electrodes. Electrochemical impedance spectroscopy (EIS) was performed in the frequency range from 1 MHz to 0.1 Hz in the temperature range of 30-80° C. The ionic conductivity (σ) was calculated according to Eq. (3):

$$\sigma=T/(R_b\times S) \qquad (3)$$

where T and S are the thickness and the area of the membrane, respectively. Electrochemical stability of a membrane was measured on the same Gamry set up in the voltage range −0.2 to 5 V at a sweep rate of 0.5 mV s$^{-1}$. The membrane was assembled into a battery, in which stainless steel disc and metallic lithium were served as working and reference/counter electrodes, respectively. The rate capability and cycling stability were tested at different C-rates (1 C=190 mAhg$^{-1}$) using an Arbin system (Arbin Instruments, USA).

Figure 7A:
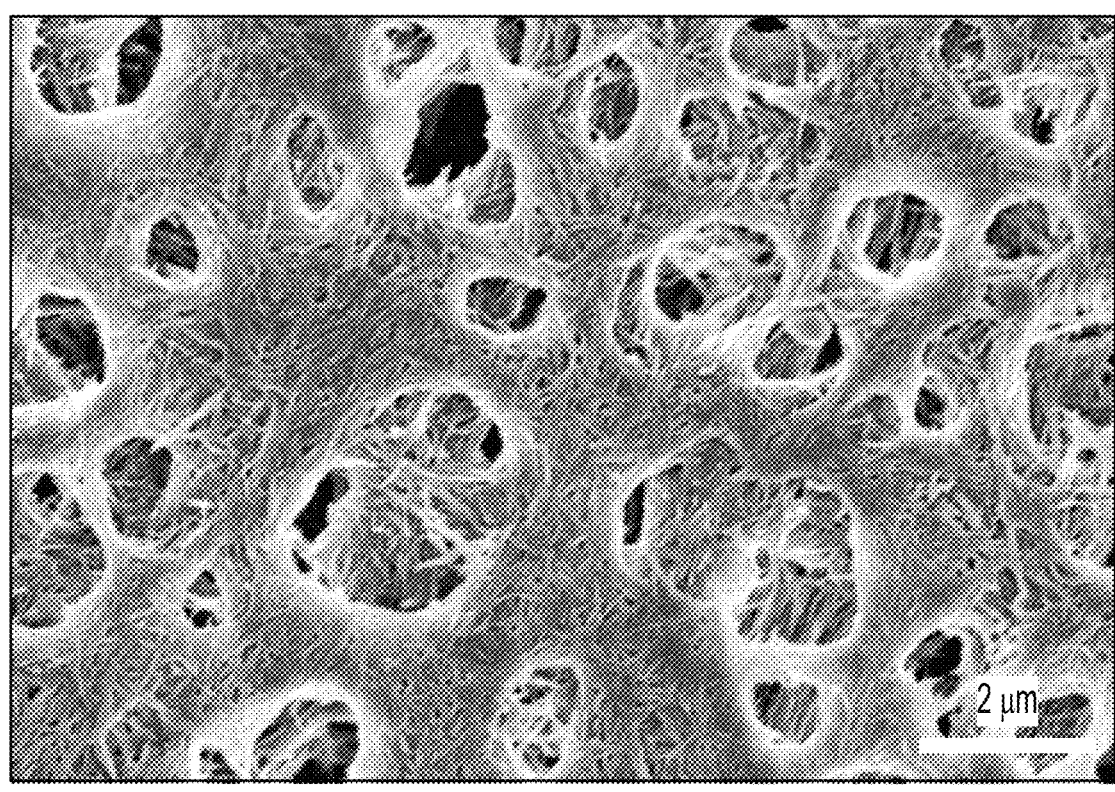
FIG. 7A is an SEM image of a top surface of a PEI-30 wt. % Al$_2$O$_3$NWs membrane
Figure 7B:
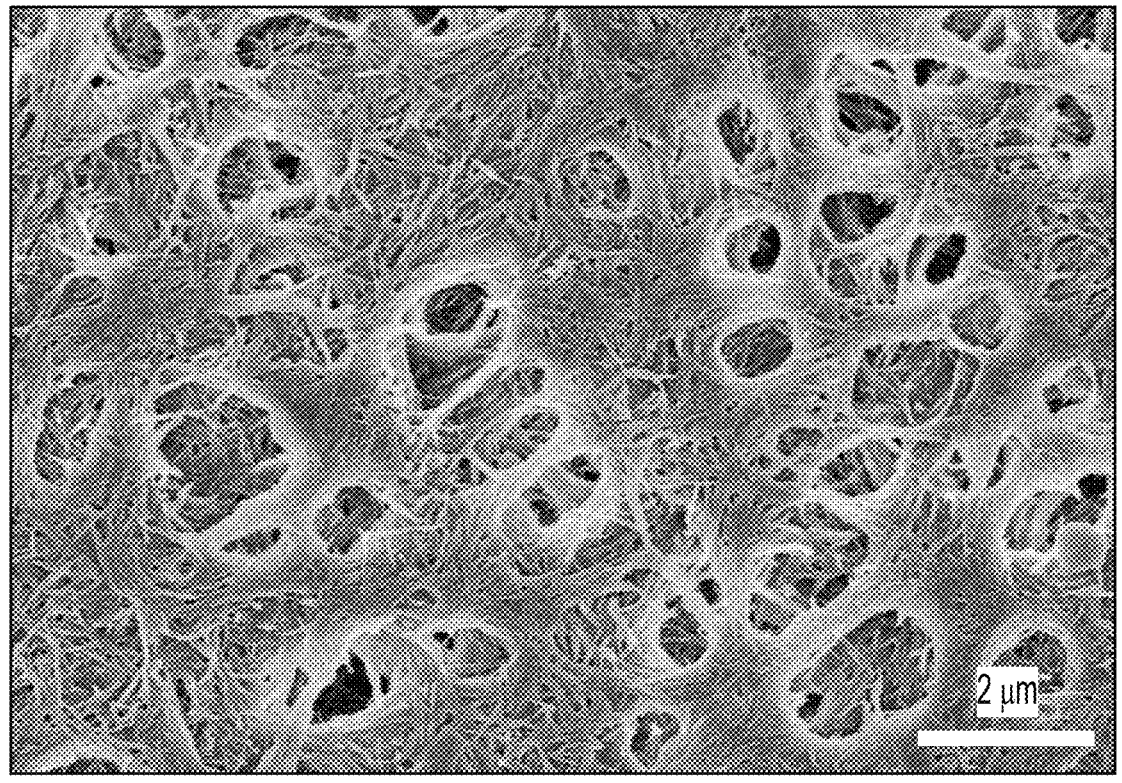
FIG. 7B is an SEM image of a bottom surface of the PEI-30 wt. % Al$_2$O$_3$NWs membrane. The top surface is the major surface further away from the substrate and the bottom surface is the major surface in contact with the substrate. In making this PEI-30 wt. % Al$_2$O$_3$NWs membrane, the step of subjecting the membrane to a humid environment in a humidity chamber was omitted.
Figure 8A:
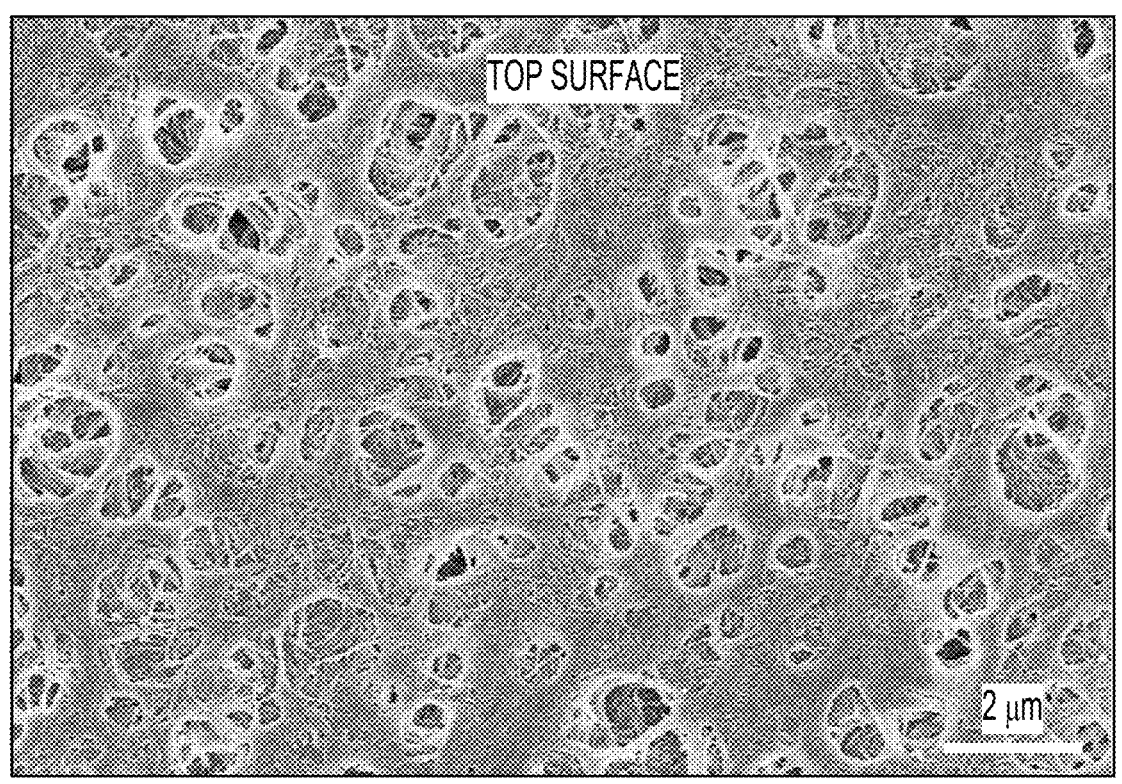
FIGS. 8A and 8B are SEM images of the top and bottom surfaces, respectively of a PEI-30 wt. % Al$_2$O$_3$NWs membrane obtained by directly immersing the membrane and glass substrate into water without peeling off the membrane from the glass substrate. Note the asymmetry in the SEM microstructure, i.e., a difference between the SEM images in FIGS. 8A and 8B.
Figure 8B:
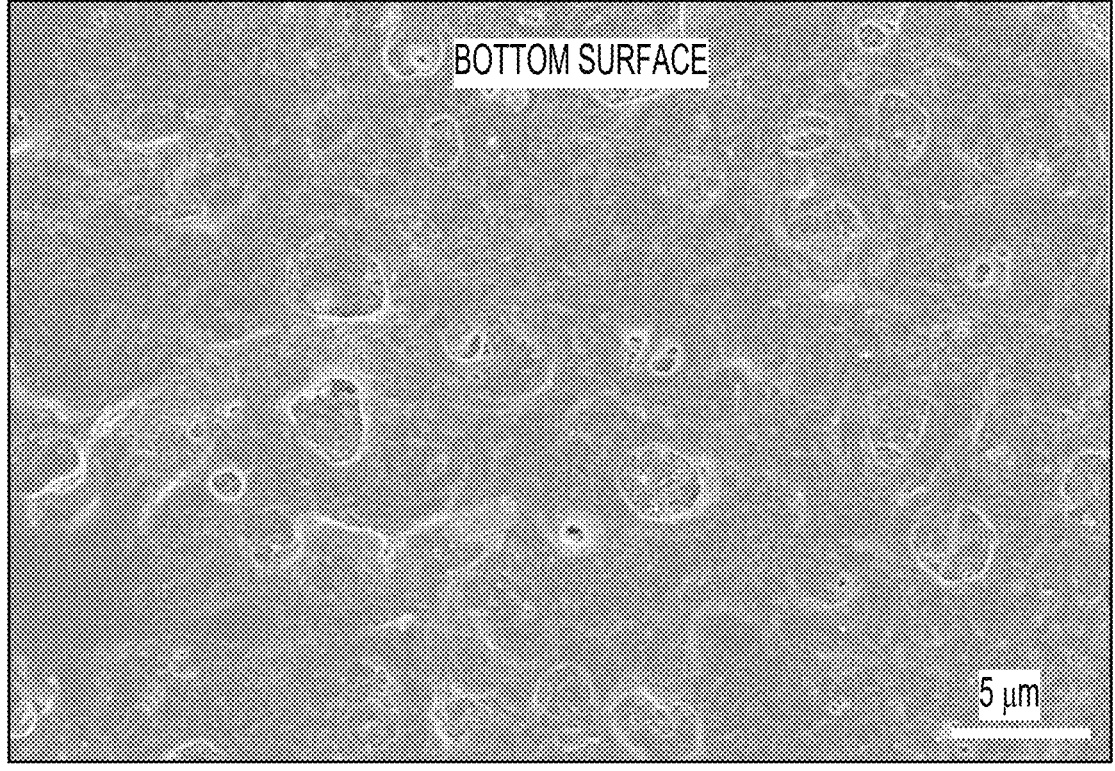

In this illustrative example, a uniform and stable dispersion of Al$_2$O$_3$ NWs (see FIG. 6 for morphology and XRD) is achieved with PEI and PVP in N-methyl-2-pyrrolidone (NMP) and used a non-solvent induced phase separation process (NIPS) to obtain porous PEI-Al$_2$O$_3$NWs separators (FIGS. 1A-1B). Water (miscible with NMP) was used as a nonsolvent for the PEI. The detailed separator fabrication procedure is described in the experimental section below. Briefly, a homogeneous dispersion of PEI, PVP and Al$_2$O$_3$ NWs in NMP was cast on a flat glass plate to obtain a gelatinous film, which was then immediately transferred into a chamber maintained at a temperature of ~50° C. (e.g., between 45 to 55° C.) and at a humidity of about 90-100% (90-95%) and was kept there for 10-20 min prior to film exposure to water. In other designs, a humidity in the range of 50-100 may be utilized. in yet other designs, a humidity in the range of 90-100% may be utilized. In some designs, the total exposure time may range from about 10 second to 200 hours. In other designs, the chamber temperature may be maintained in a range of 25° C. to 100° C. (or in a range of around 40° C. to 70° C.). In some designs, the chamber temperature may be changed during storage. In some designs, this humidity exposure stage may be crucial in obtaining high-quality membrane with a uniform porosity and thickness, while skipping this stage resulted in nonuniform, poor-quality membranes (FIGS. 7A-7B). In FIGS. 7A-7B, SEM microstructure of PEI-30 wt. % Al$_2$O$_3$ NWs membrane (FIG. 7A: top surface and FIG. 7B: bottom surface) obtained by skipping the step where the membranes are kept in the humidity chamber maintained at a temperature of 50° C. and at a humidity of 90-95% for 10 min. It is possible that the slow diffusion of water molecules throughout the film during this humidity exposure stage induced slow and homogeneous partial solidification of the PEI and promoted building a sufficiently robust porous solid scaffold. The humidity exposure stage prevented rapid PEI shrinkage and collapse of the porous structure upon rapid immersion into water. The resultant films could be easily peeled off from the substrates if the humidity exposure stage is employed, which is likely a consequence of water vapors diffusing down to the bottom surface of the membrane and minimizing adhesive forces between the membrane and the glass. Subsequently, the separated film was immersed in deionized (DI) water and kept undisturbed for ~48 h at ambient conditions. Without film peeling off, the entire glass plate needed to be immersed into water, which resulted in unsymmetrical morphology of the membrane with nonuniform pore structure (FIGS. 8A-8B). During the exposure to a DI water (coagulation bath), formation of separated polymer-rich and polymer-poor phases proceeds rapidly. PVP and NMP out-diffuse into water, soft-templating membrane pores. After the completion of the phase inversion, the membrane is dried from water and forms the PEI-Al$_2$O$_3$ NWs membrane matrix and the pores (FIG. 1B).

Alternatively (or in addition) to the exposure to a humidity controlled chamber (or a room), a cast slurry may be immersed into a solution comprising a small volume fraction of a nonsolvent (water in this example). As used here, a "nonsolvent" refers to a material to which one or more components in the slurry are insoluble, even if the nonsolvent water) may be used as a solvent in other applications. In some designs, such a volume fraction may range from about 0.0001% to about 1%.

Porous structures of the membrane prepared using NIPS are commonly determined by both the thermodynamic and kinetic aspects of the polymer chains in a nonsolvent. When the cast membrane is immersed in a nonsolvent, the chemical potential gradient of the polymer membrane leads to the mutual exchange between solvent and nonsolvent in the coagulation bath. The de-mixing behavior is dominated by the exchange rate, which can also be expressed by the interaction between solvent and nonsolvent. In a ternary polymer-solvent-nonsolvent system, the thermodynamic interactions are directly controlled by the solubility parameter differences between solvent and nonsolvent. The affinity between two different matters can be interpreted using Hansen solubility parameter (HSP), as shown in the following equation (4):

$$R_{HSP} = \sqrt{4(\delta_{dS} - \delta_{dNS})^2 + (\delta_{pS} - \delta_{pNS})^2 + (\delta_{hS} - \delta_{hNS})^2} \qquad (4)$$

where, $R_{HSP}$ is the HSP distance, $\delta_d$, $\delta_p$ and $\delta_h$ are dispersion force, polar and hydrogen bonding components, respectively; S and NS represent solvent and nonsolvent. The table in FIG. 26 presents the values of the corresponding parameters.

In particular, FIG. 26 depicts a table that includes Hansen solubility parameters (HSPs) associated with N-methyl-2-pyrrolidone (NMP) and water. Here, the $R_{HSP}$ value of NMP-deionized water pair was calculated to be 35.4. The small $R_{HSP}$ value of between NMP and water indicates an excellent miscibility between them. The information depicted in the table of FIG. 26 is documented in Reference [1], C. Hansen, "Hansen solubility parameters: a user's handbook," 2nd ed., CRC Press, 2007, pp. 21, 22, 278, which is hereby incorporated by reference herein in its entirety.

In some designs, a pure DI water as a nonsolvent may undesirably result in a relatively dense membrane with lower porosity, which is impeditive for the Li$^+$ ion transport between the cathode and the anode in the battery. To enhance porosity in the PEI-Al$_2$O$_3$ based membranes, hydrophilic and water-soluble polymer (such as a PVP) was introduced. In one example, when the as-cast film was immersed in the DI water, the exchange process between solvent and non-solvent phases proceeded slowly from both sides at the same exchange rate. Meanwhile, hydrophilic PVP gradually dissolved in the DI water and was completely removed from the membrane after 24 h of immersion, thus leading to the formation of the 3D porous membrane.

In some designs, the PVP content may play a crucial role in tailoring the morphology and mechanical strength of porous membranes. To investigate the effect of PVP additives, the PEI-30 wt. % Al$_2$O$_3$(P30) NWs membrane with different PVP contents (0, 10, 25 and 40 wt. % relative to the total weight of PVP, PEI and NWs) were fabricated. SEM images of the resulting membranes reveal that the pore size and associated porosity are higher for higher proportion of PVP in the casting solution (FIGS. 9A through 9H). To evaluate the membrane tortuosity, the Gurley analysis was conducted, which identifies the time (in seconds) required for a certain amount of air to flow through a defined area of the membrane under a specified pressure (see experimental section for details). Lower values correspond to lower resistance to air flow. The Gurley values obtained for the fabricated membranes with 0, 10, 25 and 40 wt. % PVP in the casting solutions were 510, 180, 87 and 40 s, respectively (per 100 cm$^3$ of air) (FIG. 9I), lower than that of most commercial membranes (typically in the range from 450 to 750 s). Optimization of the membrane formation may enable further reduction in the Gurley values.

Although separators with relatively low Gurley values may prompt an effective ion transport and low internal resistance in the energy-storage device, such separators may also indicate some membrane certain drawbacks related to excessive porosity or reduced mechanical properties, such as formation of internal shorts and self-discharge. Pores larger than about 1-2 μm (especially in thin separators with low tortuosity) may fail to effectively block the penetration of electrode components, such as active materials and conductive additives, which could be rather small in most cell constructions. In our experiment example, the PEI-30 wt. % Al$_2$O$_3$NWs membranes cast with PVP content greater than 25 wt. %, the final membranes possess less than or equal to about 1 μm average pore size and visibly reduce their mechanical properties and maximum elongation, making them less attractive for practical use in most applications. Considering the combined properties, including sufficiently fast air permeability in combination with excellent physical and mechanical performance for use in the energy-storage field, membranes cast with ~10 wt. % PVP additives may be advantageous for some applications.

Figures 2G, 2H, 2I, 2J, 2K, 2L, 2M, 2N, 2O, 2P:
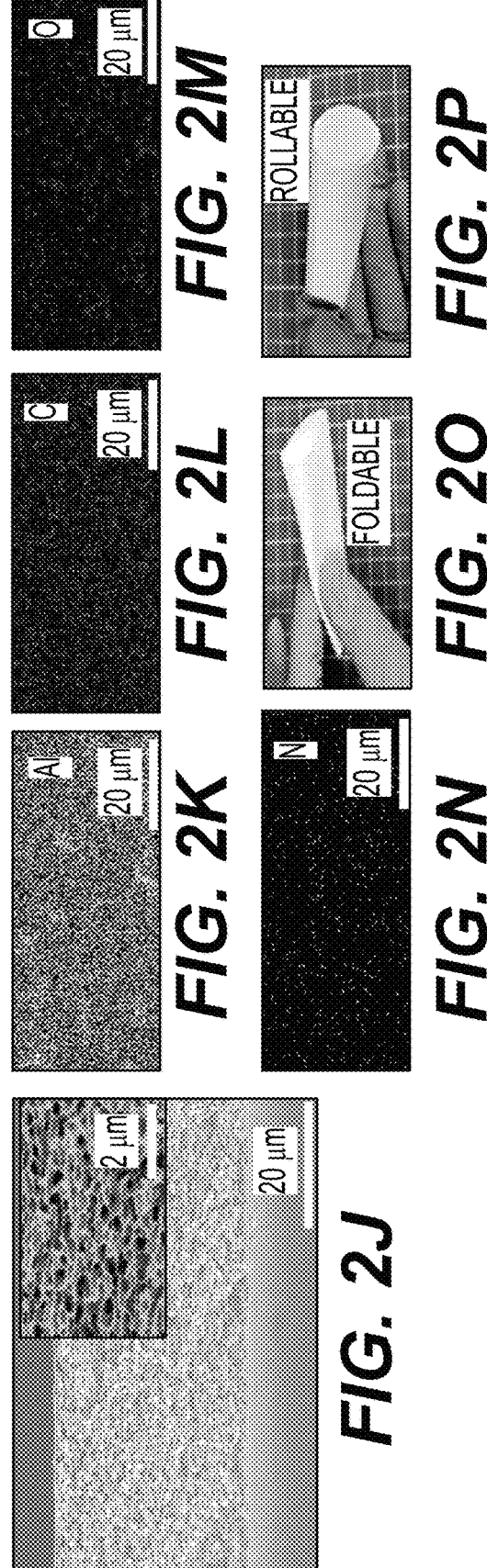
Figure 10A:
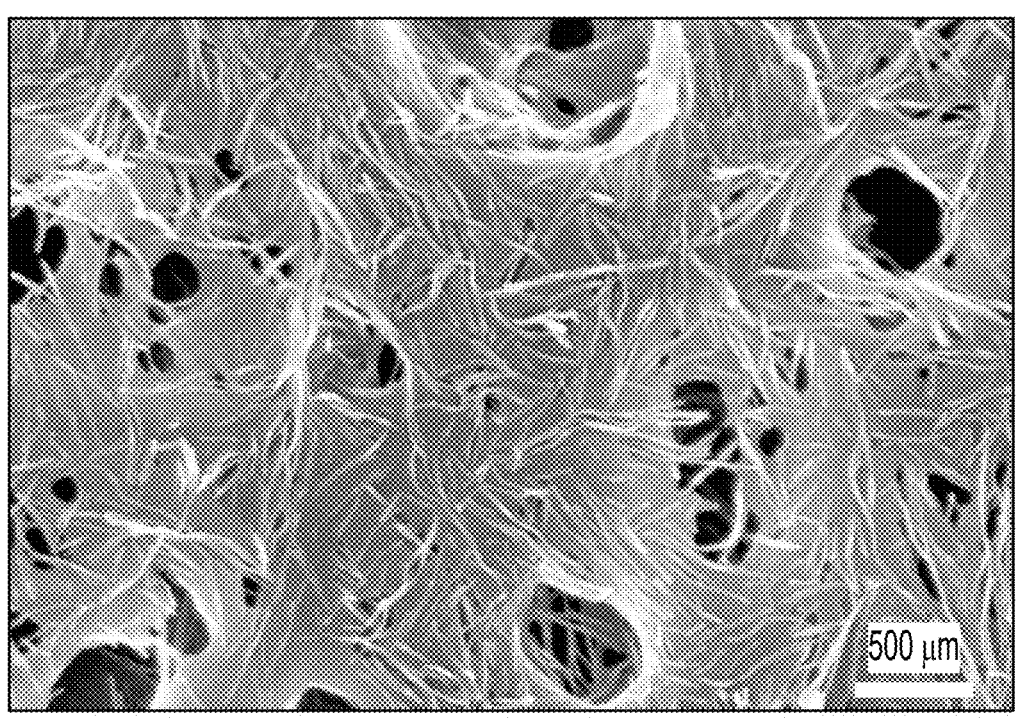
FIGS. 10A, 10B are high magnification SEM images of the 70 wt. % PEI-30 wt. % Al$_2$O$_3$NWs membrane illustrating the wrapped NWs within the PEI matrix
Figure 10B:
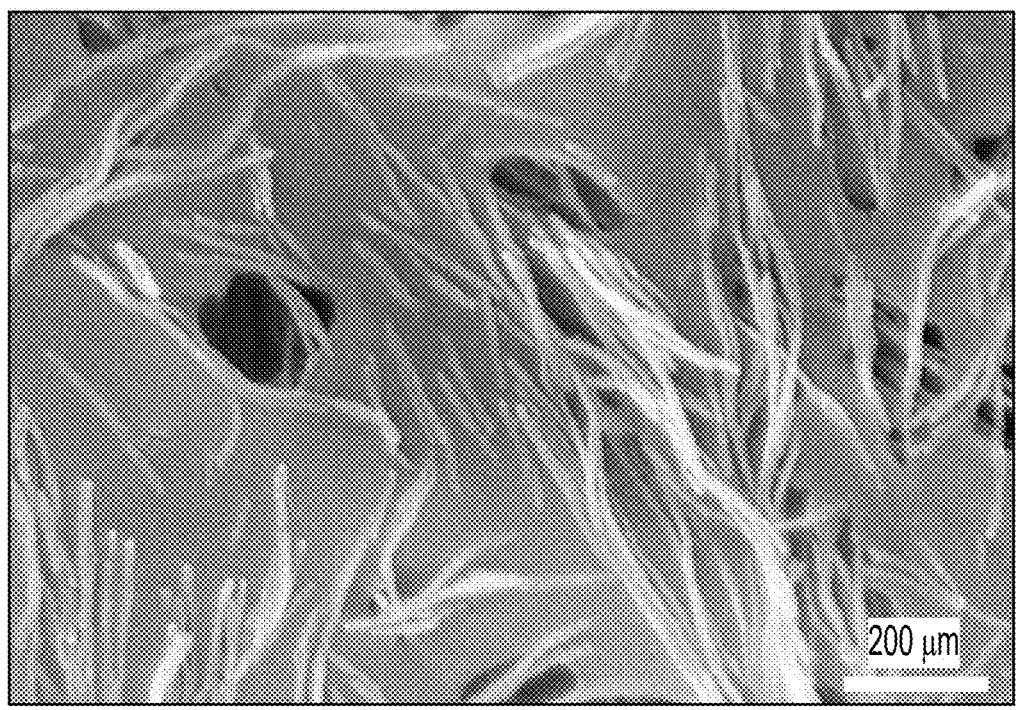

Having fixed the PVP content in one example, the Al$_2$O$_3$NWs content in the casting solution was evaluated to determine its influence to morphology, thermal and mechanical properties of the resultant membranes. Thus, different membranes in which the casting solutions contained 0, 10, 20, 30 and 40 wt. % of Al$_2$O$_3$NWs (relative to the total weight of NWs and PEI) were fabricated with 10 wt. % PVP, which are referred to as PEI, P10, P20, P30, and P40 (see the experimental section). FIGS. 2A-2J show the SEM images revealing morphologies of the different membranes. From the cross-section images and enlarged insets, one could observe sponge-like porous microstructures with sub-micron pores in the as-prepared pure PEI and PEI-Al$_2$O$_3$NW composite membranes. Highly porous structures allow large liquid electrolyte retention and improved ion conductivity, while the small size of the pores may be beneficial for the prevention of liquid electrolyte leakage, decreasing self-discharge and inhibiting the excessive growth of the lithium dendrites in the interfacial layer. The thicknesses of the produced composite membranes were determined to be 30±2 μm, if no external pressure is applied. Energy dispersive X-ray (EDX) elemental mapping confirmed the presence and uniform distribution of Al, C, O and N (FIGS. 2K-2N). A high-resolution SEM image of the P30 membrane reveals the small size and uniform dispersion of Al$_2$O$_3$NWs (FIGS. 10A-10B). In particular, FIGS. 10A, 10B are high magnification SEM images of the 70 wt. % PEI-30 wt. % Al$_2$O$_3$NWs membrane illustrating the wrapped NWs within the PEI matrix. The highly interconnected Al$_2$O$_3$NWs-decorated structure reinforced by van der Waals interactions and hydrogen bonds at the interface may be expected to enhance the mechanical properties and thermal stability of the resulted PEI-Al$_2$O$_3$NW separators. Finally, the produced composite membranes are easily rollable and foldable without inducing visible damages, with excellent overall mechanical flexibility, which is important for practical applications during cell assembling (FIGS. 2O-2P).

Figures 3A, 3B, 3C, 3D:
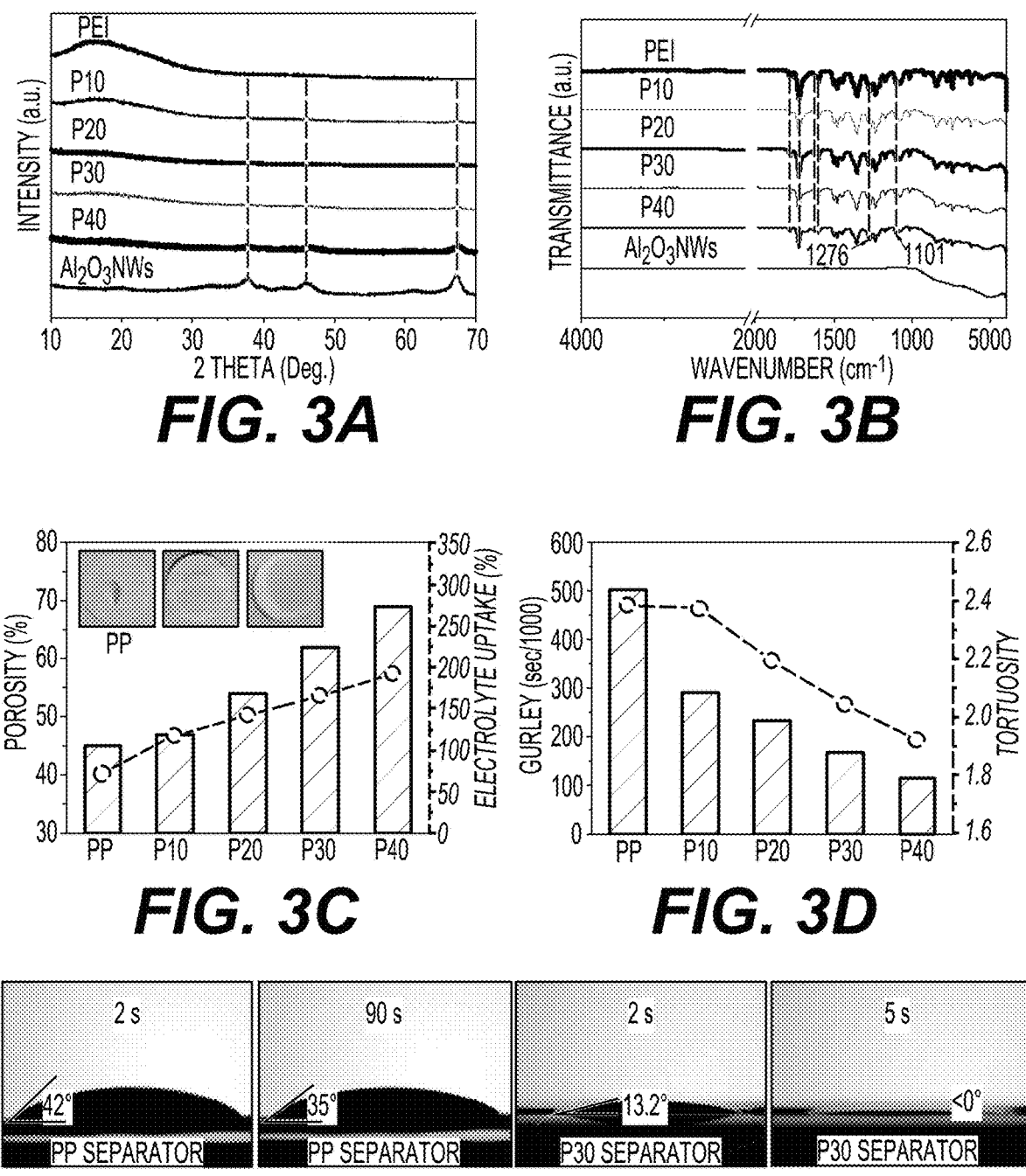
FIG. 3A shows x-ray diffraction data of membranes (PEI-0 (P0), PEI-10 (P10), PEI-20 (P20), PEI-30 (P30), and PEI-40 (P40)) and Al$_2$O$_3$ NWs.
FIG. 3B shows FTIR spectra of membranes (PEI (P0), PEI-10 (P10), PEI-20 (P20), PEI-30 (P30), and PEI-40 (P40)) and Al$_2$O$_3$ NWs.
FIG. 3C shows porosity and electrolyte uptake data (expressed in wt. %) of polypropylene (PP), P10, P20, P30, and P40 membranes.
FIG. 3D shows Gurley and tortuosity data of polypropylene (PP), P10, P20, P30, and P40 membranes.

X-ray diffraction (XRD) patterns of a series of PEI-Al$_2$O$_3$NW separators confirm the presence of individual phases for both PEI (broad peak at $2\theta=12°$) and Al$_2$O$_3$NWs ($2\theta=37.8°$, $46.2°$ and $67.3°$) (FIG. 3A). Fourier transform infrared spectra (FTIR) of different composite separators also reveal the presence of characteristic vibrational frequencies of pure PEI (e.g., C—H stretching vibrations at 3060 cm$^{-1}$ and 2955 cm$^{-1}$, C=O stretching vibrations 1650 cm$^{-1}$, and C—O and C—O—C vibrations at 1276 cm$^{-1}$ and 1101 cm$^{-1}$, respectively) and Al$_2$O$_3$NWs (broad band below 700 cm$^{-1}$) (FIG. 3B). Taken XRD and FTIR data together, the composite separators can be considered as mixed-phase materials that retain the individual phases and chemical signatures of the components, as should be expected due to low processing temperatures.

Commercial polyolefin-based separators are known to exhibit low porosity and poor wettability with the polar carbonate-based liquid electrolytes due to their discrete and slit-like pore structures, high tortuosity, intrinsic material hydrophobicity and low surface energy. These not only hinder the electrolyte filling during battery assembly but also manifest in low ion conductivity, resulting in limited cycle capacities at high current densities. For this reason, the physical properties (e.g., porosity, electrolyte uptake, Gurley number and tortuosity) of PEI-Al$_2$O$_3$NW separators in comparison with commercial PP separators were evaluated (FIGS. 3C-3D). The PP separators exhibit lower porosity and electrolyte uptake and higher Gurley numbers than any of the PEI-Al$_2$O$_3$NW separators (see experimental section for the employed methods). For the latter, the porosity increases with higher NWs loading in the PEI matrix, which in turn results in an increased electrolyte uptake. However, the increase in electrolyte uptake is not a linear function of NWs content. For example, the exemplary 10 and 40 wt. % Al$_2$O$_3$NWs separators (referred to as P10 and P40 separators, respectively) exhibit porosities of about 47 vol. % and about 69 vol. %, and electrolyte uptakes of about 117 and about 191%, respectively. Hence, Al$_2$O$_3$NWs separators with total porosities (including closed porosity) in the range of about 47 vol. % and about 69 vol. % may be formed by varying the NW content (in this case, between about 10 and 4 about 0 wt. %). Broader porosity range (e.g., between about 30% and about 80-90%) may be attained by further tuning NW and PVP fractions as well as membrane formation protocols. The Gurley values of the membranes decreased from about 289 s to about 115 s when NW content was increased to about 40 wt. % in this example. The lower tortuosity of PEI-Al$_2$O$_3$NW separators calculated according to the relationship between McMullin number and porosity (the table in FIG. 27) suggests that the PEI-Al$_2$O$_3$NW separators could effectively facilitate Li-ion transport. These results, taken together, indicate that the addition of Al$_2$O$_3$NWs likely promotes the inter-diffusion between nonsolvent and solvent in the casting solution and helps to mechanically reinforce the polymer network, thus controlling the pore size and the total pore volume of the resulting composite membranes, eventually manifesting in superior membrane properties. PVP may similarly be used to control porosity.

To investigate the wettability of PEI-Al$_2$O$_3$ NW separators in comparison with the commercial PP separators, the contact angles between different separators and the liquid electrolyte were analyzed (FIGS. 3E-3H). PP separator exhibited a contact angle of 42° after ~2 s (recorded immediately after dropping the liquid electrolyte on the separator surface), which then decreased to 35° after 90 s (FIGS. 3E and 3F). In the case of a P30 separator, for comparison, the initial contact angle after 2 s was as low as ~13.2°. The electrolyte droplet then infiltrated into the separator in as early as 5 s, indicating essentially a contact angle of ~0° (FIGS. 3G and 3H). The droplet of liquid electrolyte immediately infiltrated into P30 and P40 separators while the droplet could still be seen on the PP separator surface even after 15 min (consistent with the inset in FIG. 3C). The superior wettability of PEI-Al$_2$O$_3$ NW membranes relative to the commercial PP separator is primarily derived from the high polarity of imide and even more so of Al$_2$O$_3$, while the nonpolar nature of PP results in a diminished affinity between the PP separator and the electrolyte. In addition, the higher porosity of PEI-Al$_2$O$_3$NW separators should additionally contribute to the observed improved wettability.

Figure 11A:
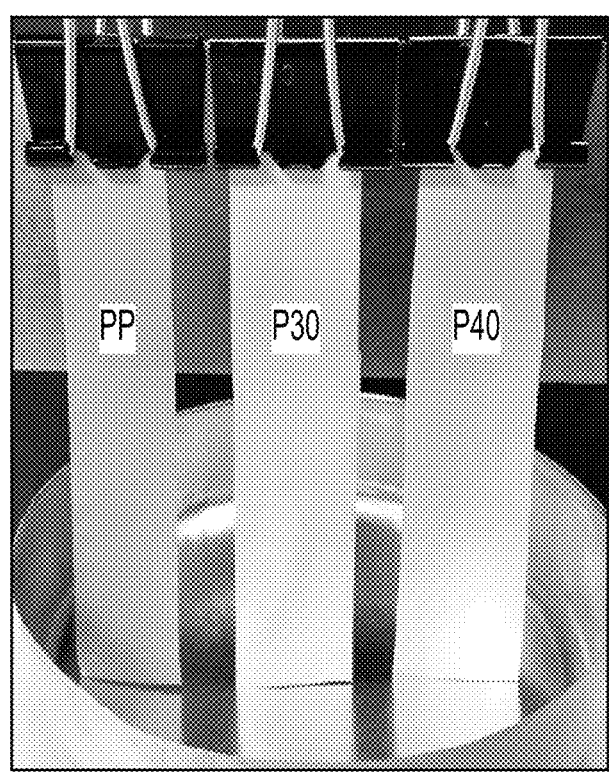
FIGS. 11A, 11B are digital camera images showing the diffusion of an electrolyte (1 M LiPF$_6$ in EC:DEC (1:1, v/v) by capillary action into PP, P30, and P40 separator membranes, before immersion of the separator membranes into the electrolyte and after 30 min, respectively. EC is ethylene carbonate and DEC is diethyl carbonate.
Figure 11B:
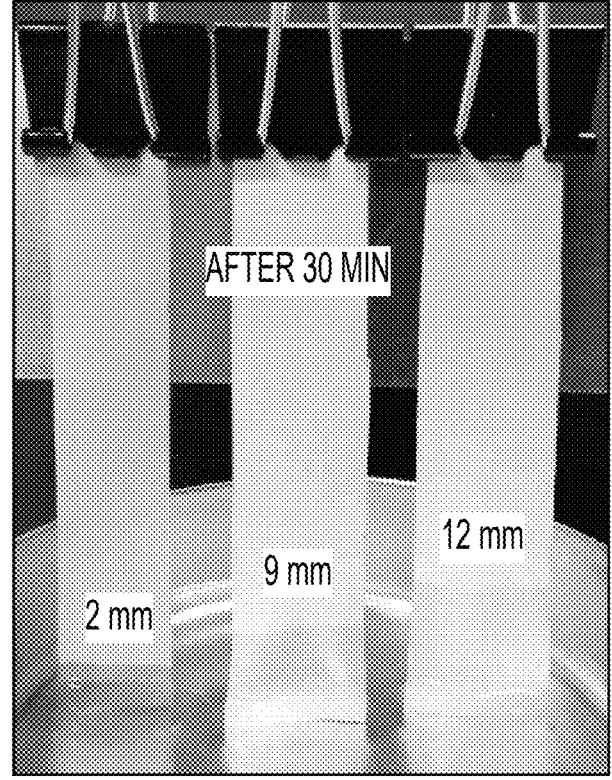

The inset of FIG. 3C and FIGS. 11A-11B provide additional insights on separators' wetting properties. By suspending the separators vertically so that their bottom is slightly immersed in the electrolyte, the upward diffusion distance traversed by the electrolyte via capillary action may be measured (FIGS. 11A-11B). The distance traversed by the electrolyte for the same time was 4.5 and 6 times higher for P30 and P40 separators than for the PP separator, suggesting a more efficient capillary action for the composite separators, consistent with the interconnected pores and superior wettability of PEI-Al$_2$O$_3$ NW separators.

Figures 4A, 4B, 4C, 4D:
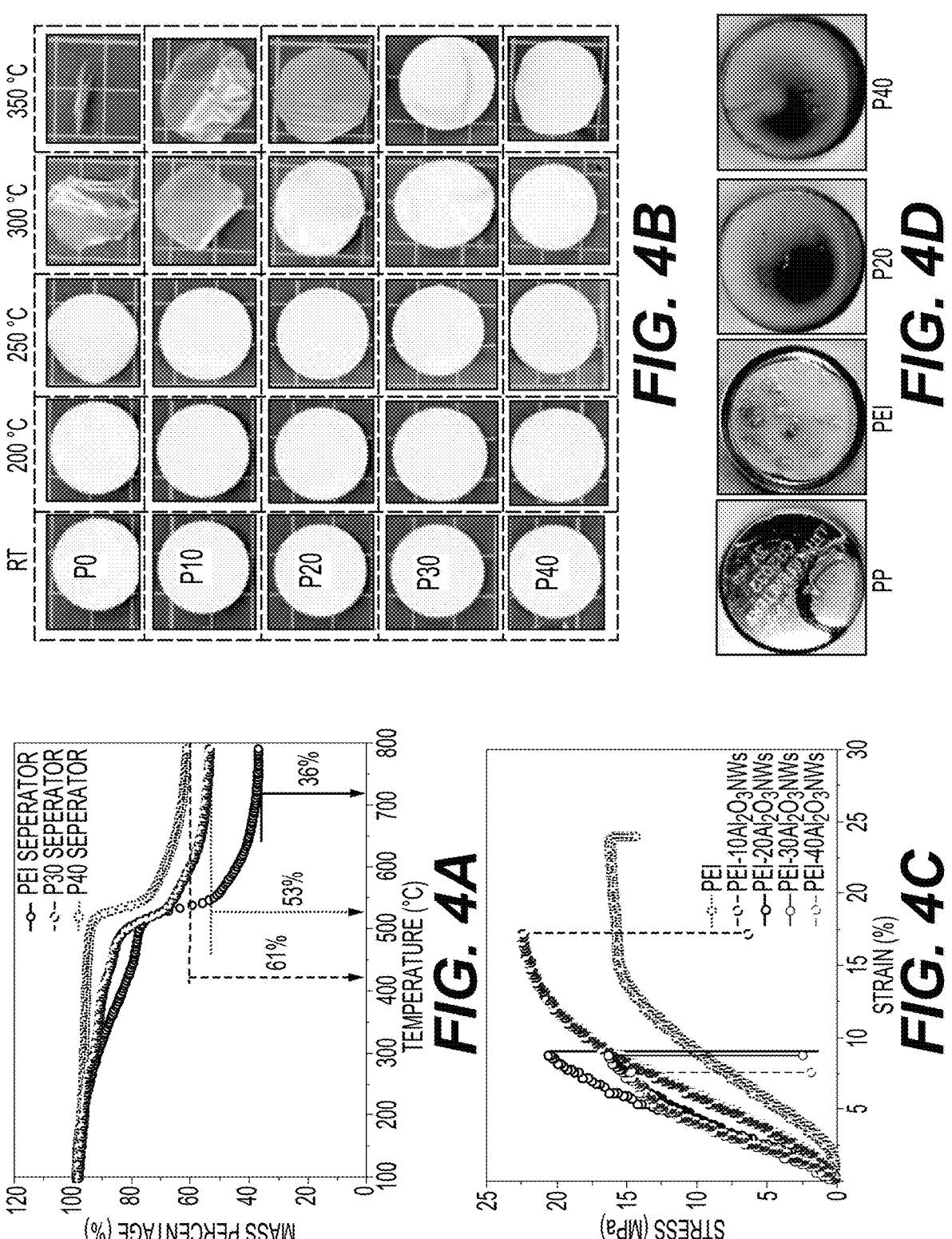
FIG. 4A shows thermogravimetric analysis (TGA) data for PEI, P30, and P40 separator membranes.
FIG. 4B show digital camera images of PEI, P10, P20, P30, and P40 separator membranes at room temperature, 200° C., 250° C., 300° C., and 350° C., illustrating the relative dimensional stability of membranes under thermal stress.
FIG. 4C illustrates engineering stress-strain curves of PEI, P10, P20, P30, and P40.
FIG. 4D shows representative digital camera images of polypropylene (PP), PEI, P20, and P40 membranes after ignition.
Figure 12:
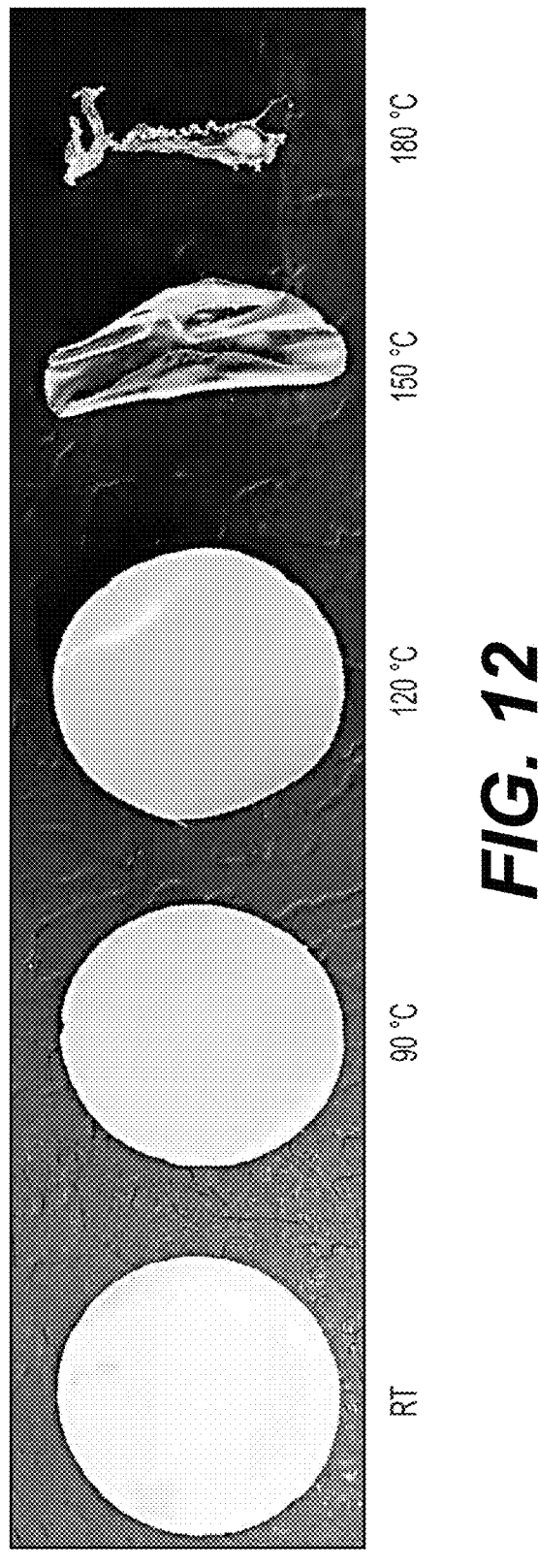
FIG. 12 is an optical image showing thermally induced shrinkage of a commercial PP separator (CELGARD 2400) upon heating to: room temperature, 90° C., 120° C., 150° C., and 180° C., for 30 min.

Next, thermogravimetric analysis (TGA) was conducted to evaluate the thermal stability of prepared separators, which is important for faster and more efficient jelly roll drying at elevated temperatures and additionally advantageous in enhancing battery safety. The pure PEI-based separator starts to noticeably decompose after ~300° C. (FIG. 4A), while the thermal stability improves steadily with the gradual increase in Al$_2$O$_3$NWs content. Quite remarkably, the P40 separator, for example, showed no major weight loss until ~525° C., demonstrating the beneficial effects of Al$_2$O$_3$NWs. Upon further ramping the temperature up to 800° C., pure PEI separator suffered a carbonization weight loss of 64%, much larger than for the composite separators (47% for P30 or 39% for P40). To further understand dimensional stability of the separators under heating stress, the thermal shrinkage of pieces of circularly shaped separators were monitored and digitally imaged (FIGS. 12 and 4B). The PP separator retained its stability up to 90° C. but started to deform at 120° C., curling up dramatically at 150° C. and eventually completely losing shape at 180° C. (FIG. 12). In stark contrast, the pure PEI separator exhibited no shrinkage up to 200° C., suggesting that PEI is a much more mechanically robust polymer to thermal stimulus as compared to PP (FIG. 4B). The PEI separator began to deform at 250° C., significantly wrinkling at 300° C. and ultimately losing shape at 350° C. The addition of Al$_2$O$_3$NWs significantly improved the dimensional stability of the composite separators, with an enhanced stability observed for higher loading of the ceramic NWs. In particular, the P40 separator underwent no dimension and color changes up to 300° C. The desirable heat-resistance characteristics of the as-prepared PEI-Al$_2$O$_3$NW separators are likely to largely eliminate the possibilities of short circuits due to separator shrinkage, and significantly reduce the safety hazards of LIBs when operated at elevated temperatures, or during thermal stresses via side reactions or fast charging, or in the event of starting thermal runaway reactions.

Flexible and rollable nature of the PEI-Al$_2$O$_3$NW separators (FIGS. 2O-2P) and the dimensional stability of the separators (FIG. 4B) indicated sufficient mechanical strength of the composite separators, which was quantified next. FIG. 28 depicts a table that shows the tensile properties of pure PEI and PEI-Al$_2$O$_3$ NWs separators. For the P10 and P20 separators, the ultimate tensile strength (UTS) was substantially increased compared with those of the pure PEI separator. Increasing the Al$_2$O$_3$ NWs amount from 0 to 10 wt. % led to the UTS increment from 16 to 22.5 MPa.

However, with the continual increment of $Al_2O_3$ NWs, as for the P20, P30 and P40 separators, the UTS started to decrease gradually, possibly due to the agglomeration of NWs that weaken the interfacial forces between NWs and PEI matrix. Yet, in comparison with other composite and inorganic separators previously reported for LIBs, the PEI-$Al_2O_3$NWs separators still exhibit superior mechanical strength. By further optimization of the membrane fabrication undesirable agglomeration of the NWs may be avoided and better mechanical and thermal properties attained.

The information depicted in the table of FIG. 28 is documented in either the subject application ("THIS WORK") or in one of References [2]-[7], as indicated in the Reference column. References [2]-[7] are listed below, and are each incorporated by referenced herein in their entirety:

Reference [2] Wu S Y, Huang Y L, Ma C C M, et al. Mechanical, thermal and electrical properties of aluminum nitride/polyetherimide composites, Composites Part A: Applied Science and Manufacturing 2011, 42(11): 1573-1583.

Reference [3] Holtmann, J., et al. "Boehmite-based ceramic separator for lithium-ion batteries, Journal of applied electrochemistry (2016) 46: 69-76.

Reference [4] Raja, M., et al. Thin, flexible and thermally stable ceramic membranes as separator for lithium-ion batteries. Journal of membrane science 2014, 471: 103-109.

Reference [5] Wang, Meina, et al. Improved performances of lithium-ion batteries with a separator based on inorganic fibers, Journal of Materials Chemistry A 2017, 5: 311-318.

Reference [6] Li H, Wu D, Wu J, et al. Flexible, High-Wettability and Fire-Resistant Separators Based on Hydroxyapatite Nanowires for Advanced Lithium-Ion Batteries, Advanced materials 2017, 29: 1703548.

Reference [7] Lalia, B. S., Samad, Y. A. and Hashaikeh, R., Nanocrystalline-cellulose-reinforced poly(vinylidenefluoride-co-hexafluoropropylene) nanocomposite films as a separator for lithium ion batteries, Journal of Applied Polymer Science 2012, 126: E442-E448.

Figure 13:
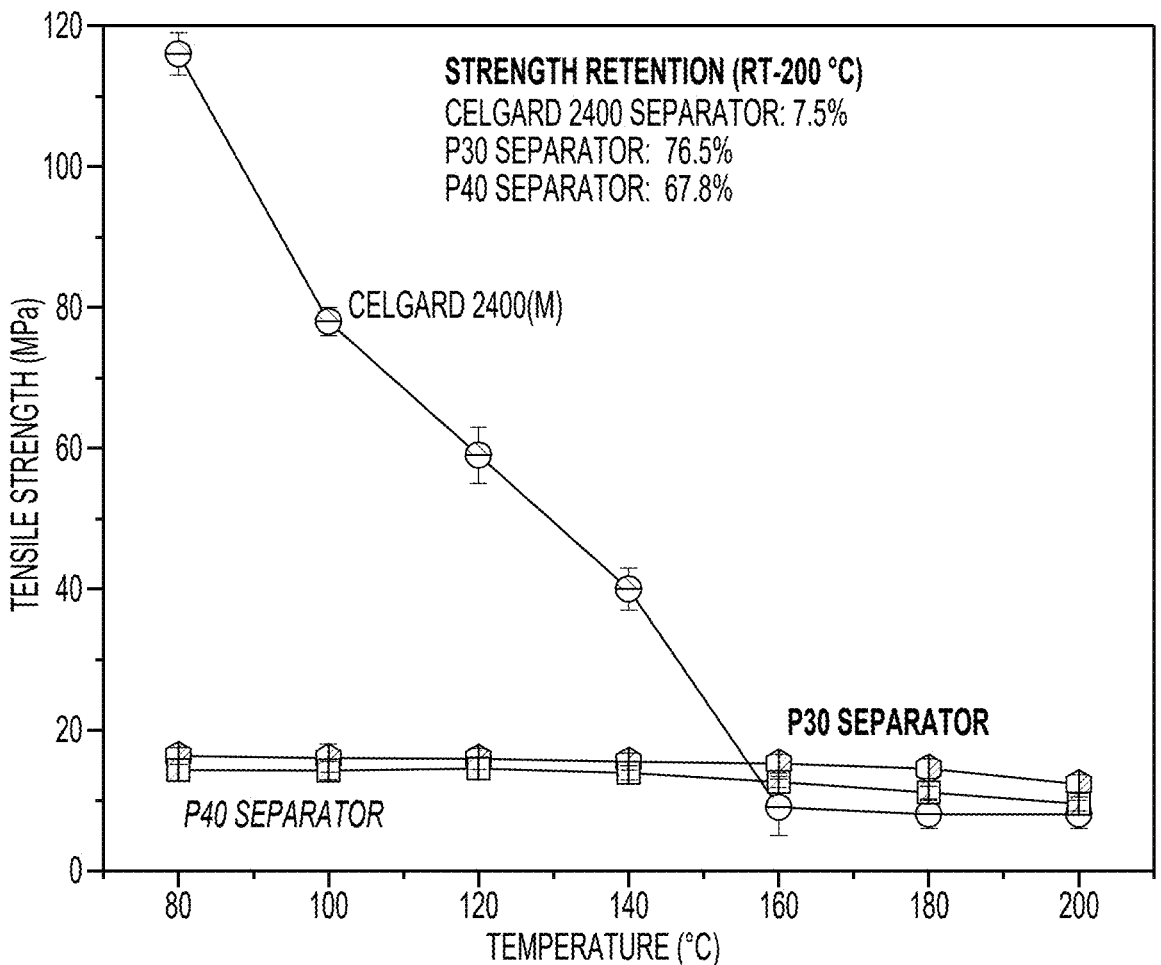
FIG. 13 is a graphical plot of the dependence of tensile strengths of separators (CELGARD 2400, P30, and P40 separator membranes) on heat treatment temperatures. The duration of heat treatment was 30 min.

Engineering stress-strain curves of the composites are shown in FIG. 4C. The $Al_2O_3$NWs contribute to the effective load transfer, leading to the hardening and slightly reduced elongation in the composite separators (still more than sufficient for practical applications). The reduced elongation may be a consequence of chemical interaction (hydrogen bonding and van der Waal forces) at the interface of ceramic $Al_2O_3$ NWs and PEI. Composite fracture is directly related to the interfacial failure or reinforcement cracking. Microvoids tend to form at low strains due to the stress concentration at the PEI-$Al_2O_3$ interfaces, resulting in a reduced level of elongation. While the PP separator exhibited a much higher tensile strength along the machine direction at room temperature (note the PP separator properties in the transverse directions are about 10 times lower), the same dropped dramatically at higher temperature (retention of 7.5% at 200° C., FIG. 13). In contrast, the as-prepared PEI-$Al_2O_3$NW separators retained ca. 76.6% of tensile strength up to 200° C.

Having established superior thermal and dimensional stability of the composite separators, the fire resistance of the liquid electrolyte (200 µL) soaked membranes was studied. FIG. 4D shows the digital images post ignition. Upon ignition of the electrolyte, the PP separator was immediately ignited, which curled up and burnt away quickly. For the pure PEI separator, it barely caught fire, and after extinguishment, the pure PEI separator shrank slightly with some blistering observed on the surface. Remarkably, the P30 and P40 separators could not be ignited at all. The liquid electrolyte burnt away and the fire self-extinguished. The separator appeared somewhat burnt but no obvious shrinkage or blistering was observed. This indicates the outstanding flame-retardant characteristics of the composite separators, likely enhanced by ceramic $Al_2O_3$ NWs.

Figure 15:
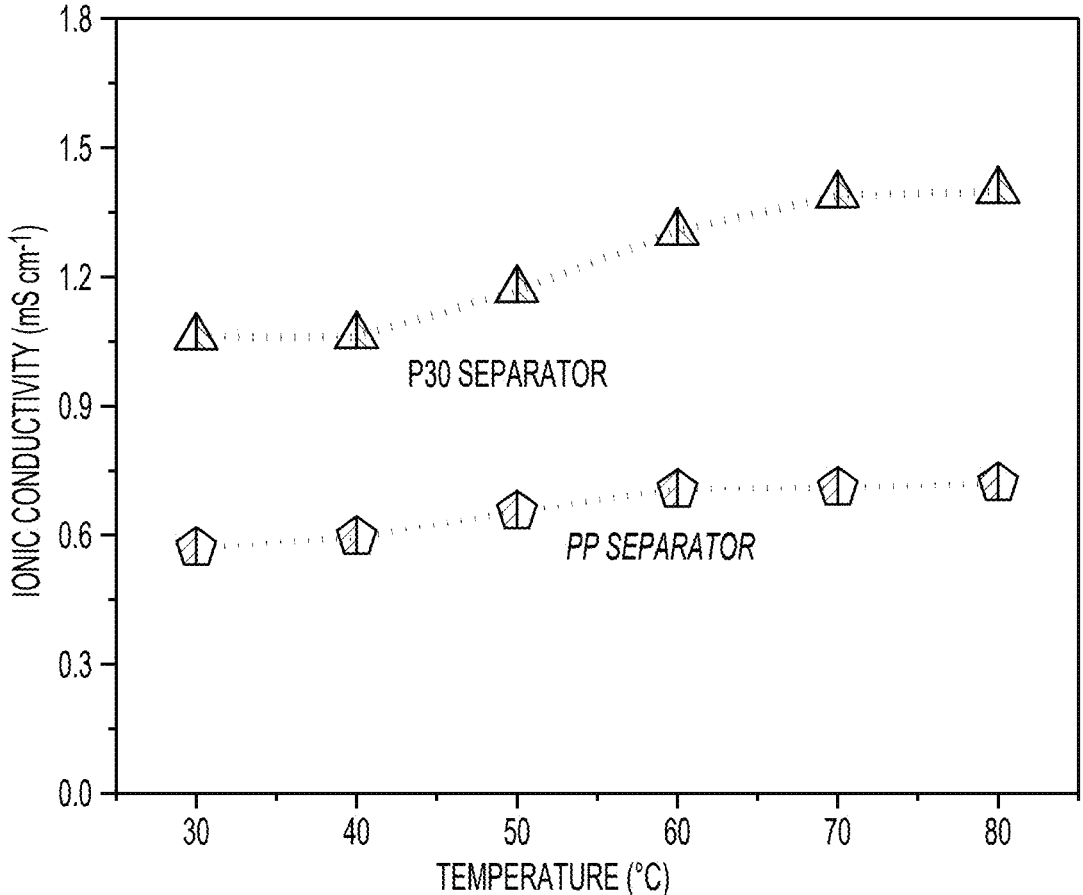
FIG. 15 is a graphical plot of the temperature dependence of ionic conductivity for PP and P30 separator membranes.

Electrochemical impedance spectroscopy (EIS) was employed to investigate the ionic conductivity of the separators infiltrated with an example liquid electrolyte (1 M $LiPF_6$ in EC/DEC, EC and DEC in 1:1 volume ratio) in symmetric cells with configuration SS|separator|SS (SS refers to stainless steel). From the Nyquist plots (FIG. 14), the ionic conductivity values were calculated as 0.63, 0.85, 1.07 and 1.41 mS for the P10, P20, P30 and P40 separators, respectively, which are all higher than that for the commercial PP separator (0.59 mS $cm^{-1}$). The superior ionic conductivity of the composite separators, especially P30 and P40, may be attributed to their higher porosity and better wettability with the employed liquid electrolyte in comparison to PP separator. FIG. 5A presents ionic conductivities of the electrolyte in the above symmetric cell set up using PP and P30 separators in the temperature range 25 to 80° C., with the conductivity increasing at higher temperature (FIG. 15). For example, the ionic conductivity at 80° C. for the P30 is up to 1.4 mS cm', which is ~ two times higher than PP (0.77 mS $cm^{-1}$). The higher conductivity of the P30 separator filled with liquid electrolyte attests to the ability of PEI-$Al_2O_3$NW separators to offer higher power and higher energy efficiency in LIBs than the commercial PP separators in a broad temperature range.

Electrochemical stability of the separators was evaluated by cyclic voltammetry (CV) in asymmetric two-electrode cells of configuration SS|separator|Li, where stainless steel (SS) serves as the working electrode and Li plate serves as the reference/counter electrode. FIG. 5B shows the CV curves of SS|P30|Li and SS|PP|Li cells in the potential range −0.2-5 V (vs Li/Li$^+$) at a scan rate of 0.5 mV s$^{-1}$. Two dominant redox peaks appear around 0 V, which can be ascribed to Li$^+$ ion plating and stripping processes on the SS electrode. Notably, SS|P30|Li cell exhibits a higher peak current density (1.3 mA cm$^{-2}$) relative to the SS|PP|Li cell (0.85 mA cm$^{-2}$), consistent with the enhanced Li$^+$ ion conductivity of the electrolyte when using P30 separator. Most importantly, no other redox peaks are detected in the potential window up to 5 V in both cells, attesting to excellent electrochemical stability for both separators and confirming that the P30 separator is electrochemically at least as stable as the PP separator.

Figure 16A:
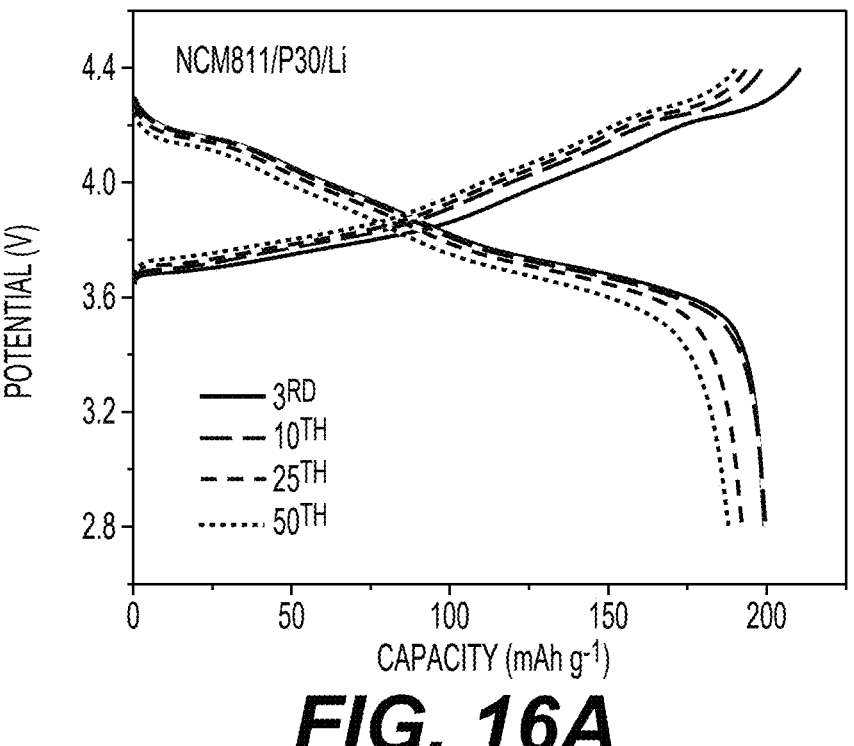
FIGS. 16A and 16B are galvanostatic charge/discharge profiles of the NCM811|separator|Li cells plotted for the 3rd, 10th, 25th and 50th cycles for a P30 separator and a PP separator, respectively.
Figure 16B:
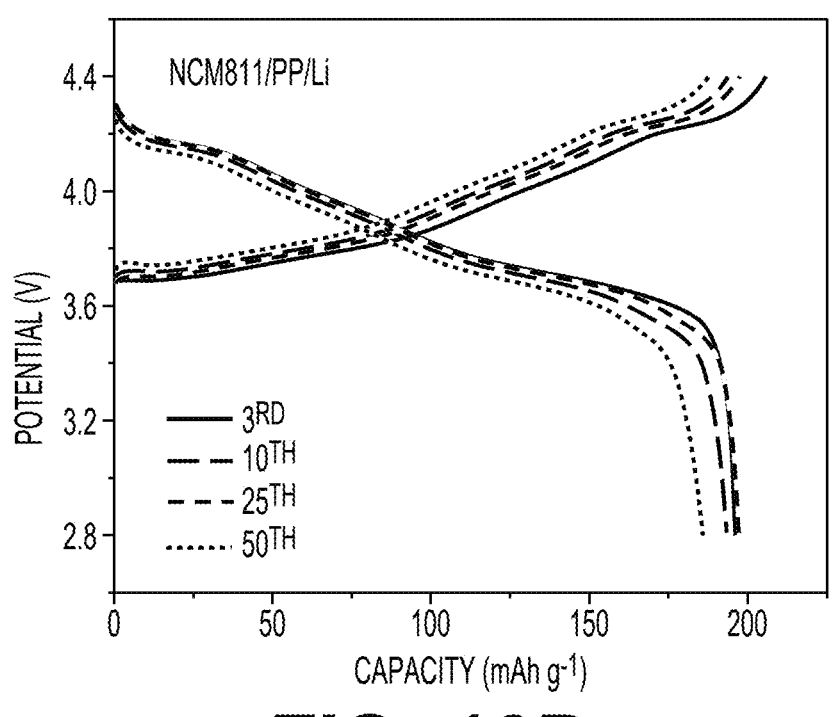
Figure 17A:
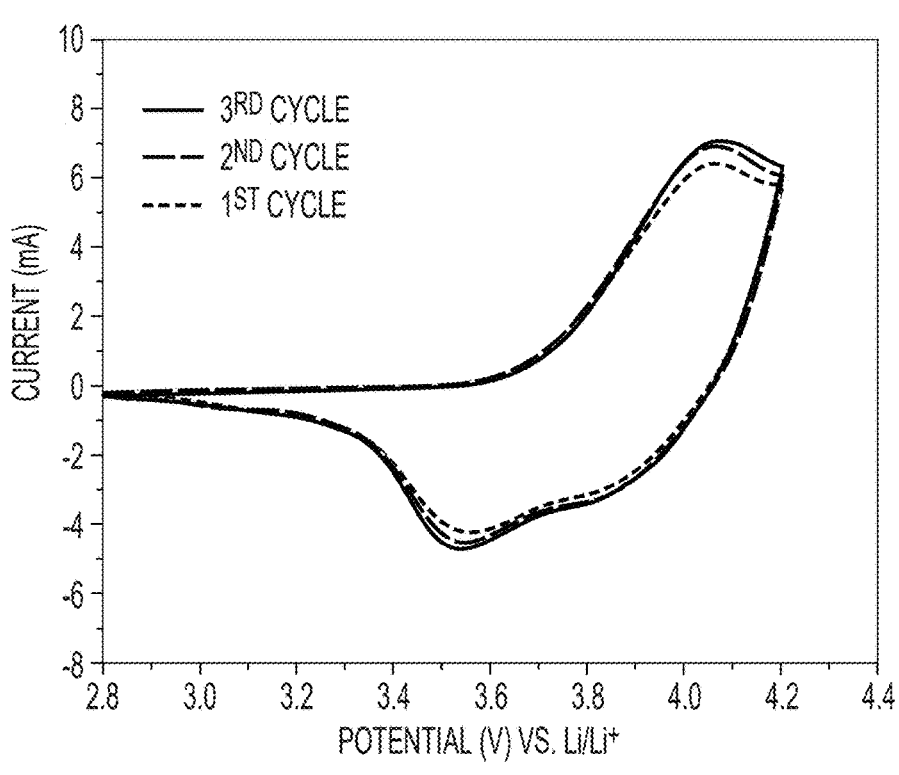
FIGS. 17A and 17B are cyclic voltammogram curves for initial 3 cycles at a scan rate of 0.2 mV s$^{-1}$ in the potential range of 2.8-4.2 V for NCM811|PP|Li cells and NCM811|P30|Li cells, respectively.
Figure 17B:
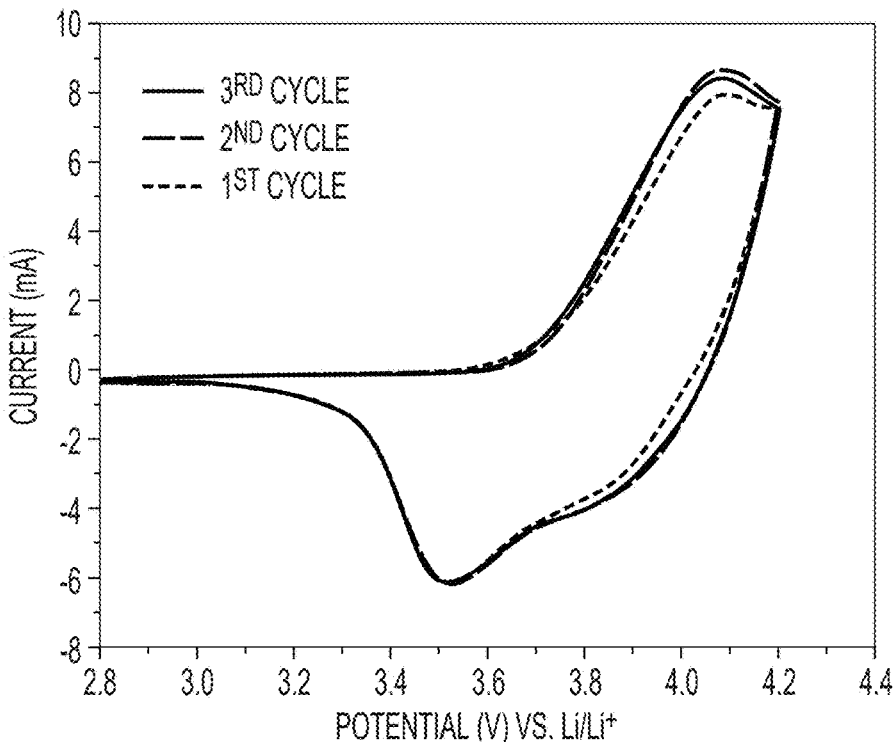
Figure 18:
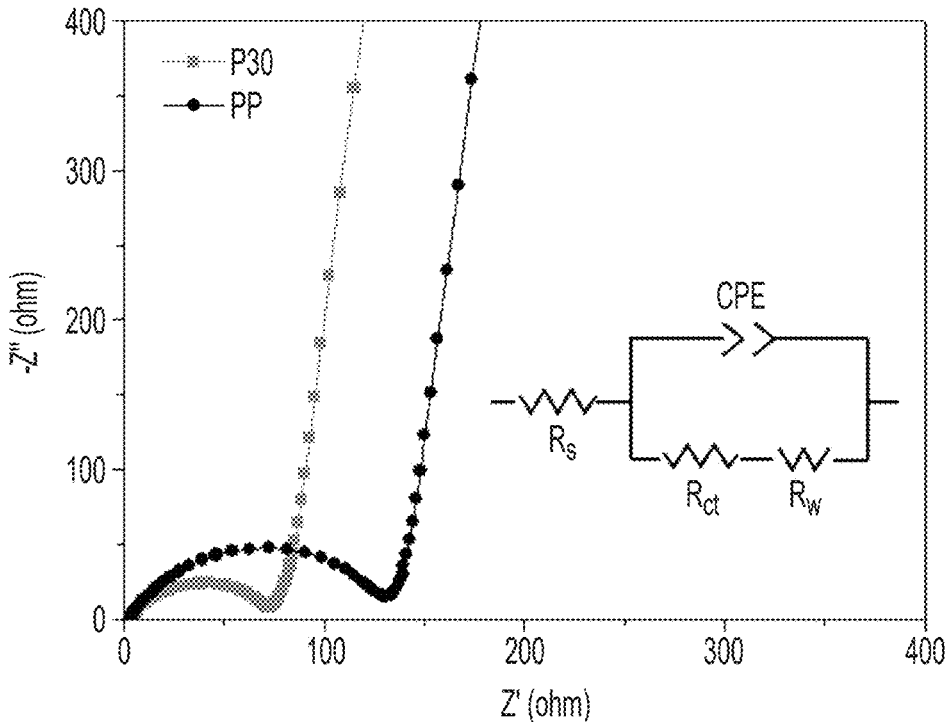
FIG. 18 is a Nyquist plot of the battery test cells of the structure NCM811/liquid electrolyte-soaked separator membrane/Li metal anode with P30 separator membrane and PP separator membrane at room temperature.
Figures 19A, 19B, 19C, 19D:
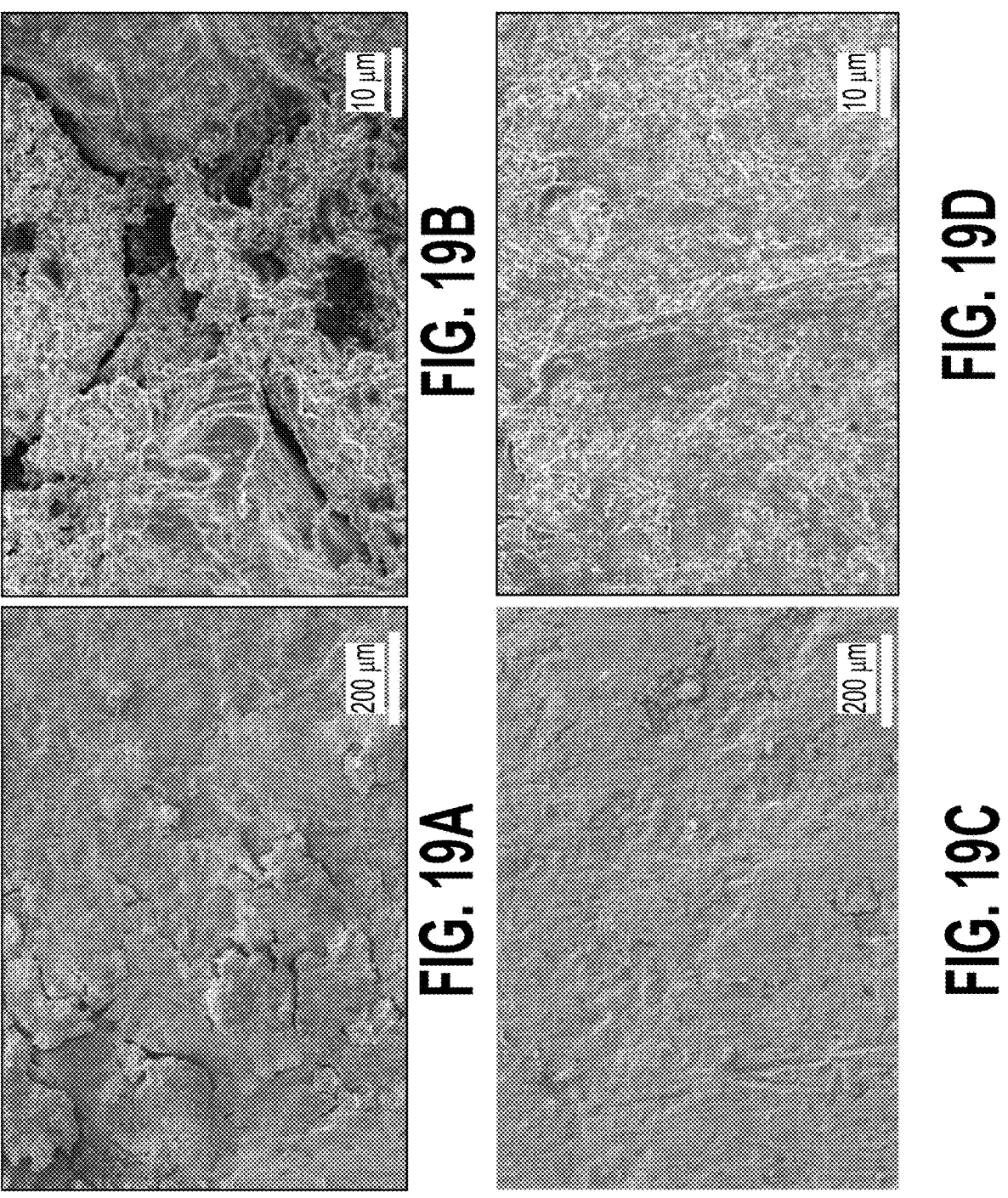
FIGS. 19A, 19B, 19C, and 19D are SEM images of Li plate in the NCM811|separator|Li cells after 100 cycles with the current density of 0.33 C (where, 1 C=190 mA g$^{-1}$).
Figures 20A, 20B:
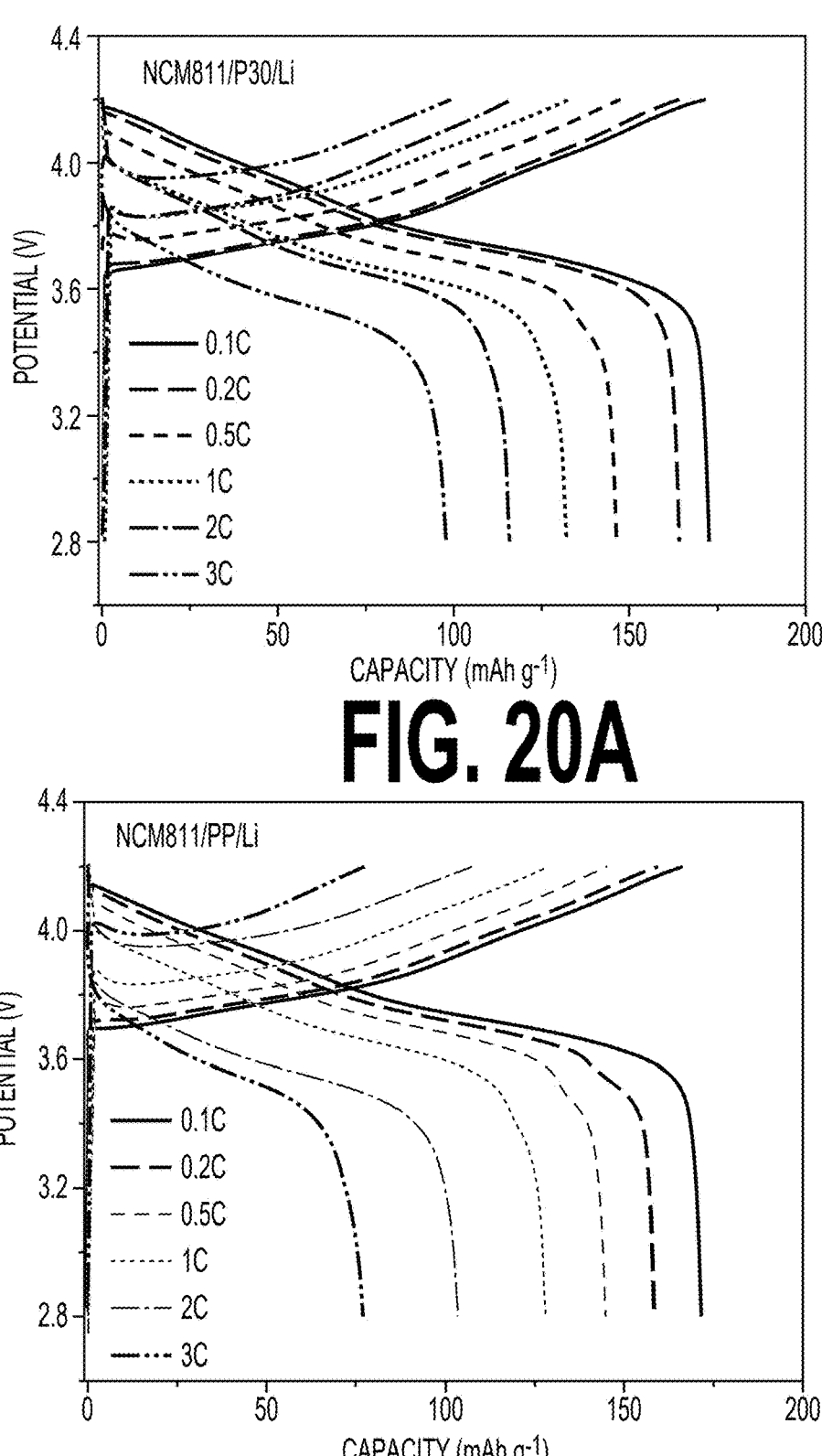
FIGS. 20A and 20B are galvanostatic charge/discharge potential profiles of the NCM811/separator/Li cells plotted for currents of 0.1 C, 0.2 C, 0.3 C, 1 C, 2 C and 3 C (where, 1 C=190 mA g$^{-1}$) for a P30 separator membrane and a PP separator membrane, respectively.

The effect of PEI-$Al_2O_3$NWs separators on battery performance was further investigated by analyzing galvanostatic charge-discharge (GCD) cycle performances using a current rate of 0.33 C within the potential range of 2.8-4.4 or 2.8-4.2 V (FIGS. 5C-5D). As seen from FIGS. 5C-5D, both cells exhibited similar discharge capacity (average capacity of 193 and 165 mAh g$^{-1}$ when operated up to potentials 4.4 and 4.2 V, respectively) as well as an average coulombic efficiency above 97% (FIGS. 16A-16B), suggesting their excellent cycling stability when either of P30 and PP separators are used. FIG. 17 depicts the CV curves for the first 3 cycles of the NCM811P30 or PP|Li cells at a scan rate of 0.5 mV s$^{-1}$ in the potential range of 2.8-4.2 V. The redox peaks were consistent with the Li$^+$ ion intercalation and deintercalation in the lattice of NCM811 and no other obvious redox peaks could be observed, indicating that both separators are stable in the above potential range even in the presence of the cathode. Compared with the PP separator, the cells with P30 separators exhibited a smaller voltage hysteresis at different cycles (FIG. 5E). Based on Nyquist plots (FIG. 18) for the above cells, the cells with P30 separators also resulted in a much smaller semi-circle than the cells with PP separators, indicating a smaller charge transfer resistance for the former cells with P30 separators. After 100 cycles, representative cells of each type were disassembled, and the Li foil anodes were imaged by SEM to observe morphological differences. The Li surface of the NCM811|PP|Li cell revealed a rough texture with cracks (FIG. 19A-19B), while the Li surface of the NCM811|P30|Li cell is relatively compact and smooth (FIG. 19C-19D). This has the implication in that PEI-Al$_2$O$_3$NW composite separator may help build a less polarized and stable interface and impede the decomposition of electrolytes. This is further reflected in C-rate dependent discharge capacity studies (FIG. 5F). The capacity drop was observed with increasing C-rate in both the cells, resulting from the electrical polarization as a result of increased resistance with increasing discharge C-rate; although both the separators performed equally until a C-rate of 0.5 C, the capacity drop was more for the cells with PP separators when compared to the ones with P30 separators at C-rates of 2 C and above. For example, the initial discharge capacities of the cells with P30 separator were 172, 164, 147, 135, 113 and 97 mAh g$^{-1}$ at 0.1, 0.2, 0.5, 1, 2 and 3 C, respectively, while those values for the cells with PP separator were 170, 161, 145, 129, 104 and 76 mAhg$^{-1}$ for the same C-rates. FIG. 20 shows the charge/discharge curves of the cells assembled with P30 and PP separators, respectively, showing slightly larger hysteresis of the PP separator-based cells at higher current densities, consistent with the observed capacities. These results clearly demonstrate that P30 separator can greatly enhance achievable capacities at high practical current densities, as a consequence of outstanding electrolyte affinity and higher porosity of PEI-Al$_2$O$_3$NW separators. Relatively high curvature of pores in such separators should also minimize the possibility of short-circuits and thus hinder the self-discharge, while maintaining high conductivity of the electrolyte due to its high chemical affinity for the electrolyte.

Figure 22:
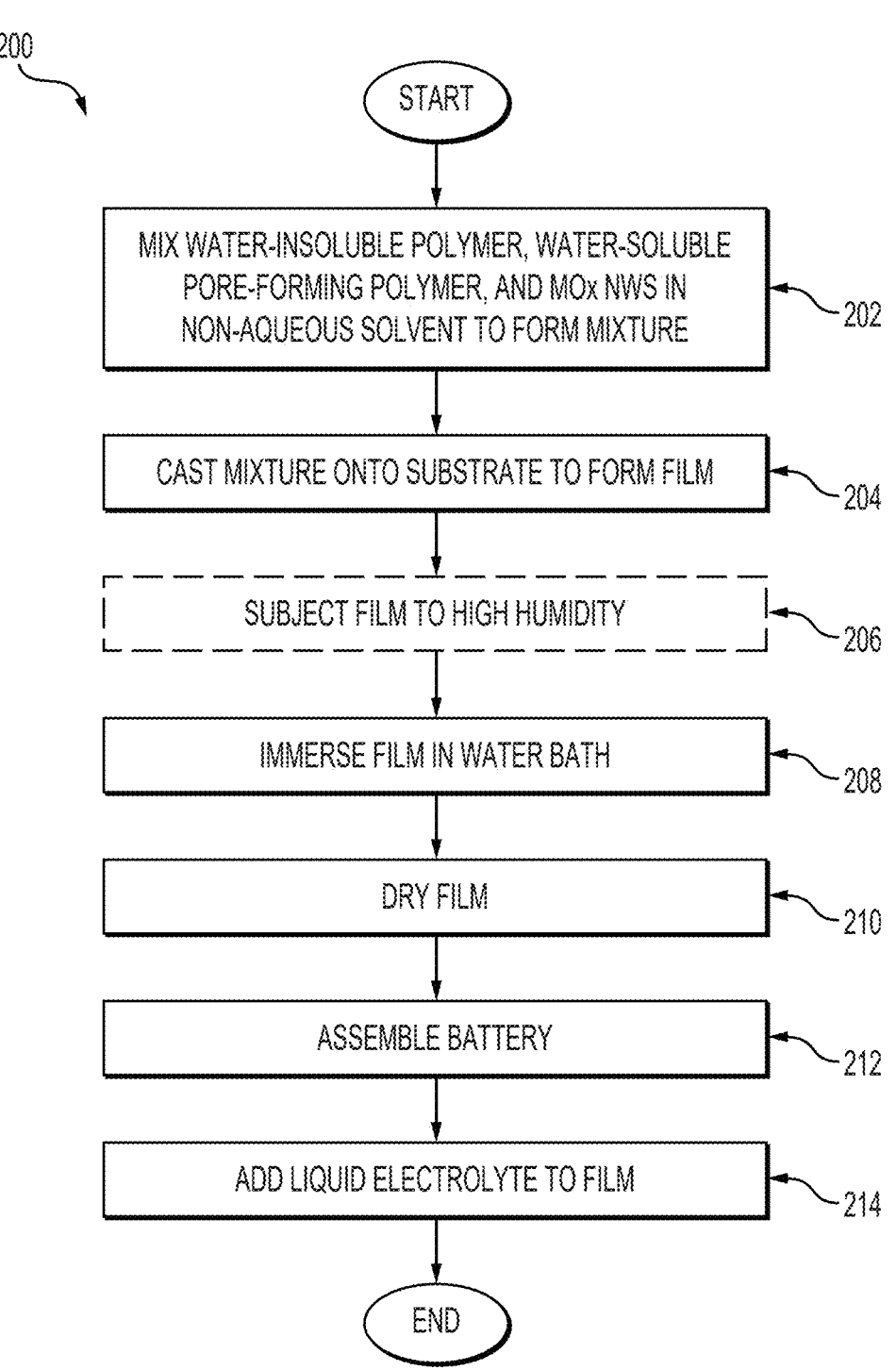
FIG. 22 is a flow diagram of a method of making a nanocomposite membrane.

FIG. 22 shows a flow diagram of a method 200 of forming a nanocomposite membrane and a battery. The PEI-Al$_2$O$_3$ NW separator membranes are examples of nanocomposite membranes. An example of nanocomposite membrane formation is explained with reference to FIGS. 1A-1B. Method 200 includes stages 202, 204, 206, 208, 210, 212, and 214. Stage 202 includes mixing a water-insoluble polymer composition, water-soluble pore-forming polymer composition, and metal oxide nanowires in a non-aqueous solvent to form a mixture. At stage 202, the water-insoluble polymer composition and the water-soluble pore-forming polymer composition are dissolved in the non-aqueous solvent. The non-aqueous solvent is chosen to be miscible with water. The water-insoluble polymer composition can include a polymer comprising a cyclic imide group. For example, the polymer can be a polyetherimide. The metal oxide nanowires can include Al$_2$O$_3$ nanowires. The water-soluble pore-forming polymer composition can include poly(vinylpyrrolidone). The non-aqueous solvent can include N-methyl-2-pyrrolidone (NMP).

At stage 204, the mixture is cast onto a substrate to form a film. Stage 206 is an optional step after stage 204 and before stage 208. Step 206 includes subjecting the film to a high-humidity environment in a range of 50% to 100% relative humidity at a temperature in a range of 25° C. to 120° C. (in some designs, from about 40° C. to about 100°

C.). For example, the film may be stored in a humidity chamber for a time period ranging from about 10 sec to 200 hours (in some designs, from about 1 to about 100 min) and the interior of the humidity chamber may be maintained in in a range of 50% to 100% relative humidity at a temperature in a range of 25° C. to 100° C. In some designs, at stage 206, the film is subjected to a high-humidity environment in a range of 90% to 100% relative humidity at a temperature in a range of 45° C. to 55° C. In some design, stage 206 is performed after the casting of stage 204 and before the immersion of stage 208. At stage 208, the film may be immersed in a water bath, such that the water-soluble pore-forming polymer composition and the non-aqueous solvent diffuse from the film into the water bath. At stage 210, the film is dried. For example, the film may be removed from the water bath and let dry. The nanocomposite membrane has been formed upon completion of stage 210. Additionally, at stage 212, the separator, the anode, and the cathode may be assembled into a battery stack or roll, with the separator interposed between the anode and the cathode (and, for example, enclosed into a pouch or a coin or a prismatic or a cylindrical housing). At stage 214, a liquid electrolyte (which may be transformed into a solid electrolyte in some designs) may be added to the assembly. In some designs, the liquid electrolyte comprises lithium ions and one or more carbonate solvents. The liquid electrolyte wets the nanocomposite membrane and the stack, resulting in an electrolyte filled separator, where the liquid electrolyte fills at least a fraction of the pore phase of the separator membrane (nanocomposite membrane). Stage 214 can also include sealing the assembly to form a battery (e.g., battery 100 in FIG. 21).

Although demonstrated highly beneficial properties in coin cells in some examples, the disclosed composite separator membranes may be particularly advantageously used in larger form-factor cells (e.g., multi-layered pouch, prismatic, cylindrical, etc.) for consumer electronics, electric vehicle applications, grid storage applications, among others. In some designs, such cells may be large and exhibit capacity in the range from about 10 Ah to about 40 Ah) or be ultra-large and exhibit capacity in the range from about 40 Ah to about 400 Ah or be gigantic and exhibit capacity in the range from about 400 Ah to about 4,000 Ah or even more.

Although demonstrated highly beneficial properties in cells with NCM cathodes in some examples, the disclosed composite separator membranes may be effectively used with other types of intercalation-type cathode materials, such as NCA, NCMA, LNO (including doped LNO), LMO, LCO, LCAO, LMP, LFP, LMFP, LCP and other lithium transition metal oxide or phosphate or sulfate or silicate or their various mixtures.

Although demonstrated highly beneficial properties in cells with intercalation-type cathodes in some examples, the disclosed composite separator membranes may be effectively used with conversion-type cathode chemistries (for example, with metal fluoride or metal sulfide comprising cathodes, among others) or a mixture or conversion-type and intercalation-type cathode chemistries.

Although demonstrated highly beneficial properties in cells with Li metal anode in some examples, the disclosed composite separator membranes may be effectively used with intercalation-type anodes (e.g., soft carbons, hard carbons, natural graphite, synthetic graphite, lithium titanate, their various combinations, etc.), alloying-type or conversion-type anodes (e.g., Si or Sn-comprising anodes, metal oxide-comprising anodes, etc.) or with anodes comprising a mixture of intercalation and conversion-type anode materials (e.g., a mixture of carbonaceous/graphitic anode materials and a silicon or silicon oxide or tin or tin oxide or other metal oxide anode material, etc.).

Although demonstrated for Li-ion or Li-metal batteries in some examples, the composite separators would be of tremendous interest in other energy storage devices including Na-ion, Na-metal, Li—S, Li—$O_2$, Na-ion and other types of batteries, supercapacitors, and hybrid devices.

Although embodiments described above relate to formation of a single layer composite membrane comprising a suitable polymer (e.g., PEI, among others) and a suitable filler (e.g., $Al_2O_3$ nanofibers, among others), it will be appreciated that some designs may benefit from the formation of membranes comprising two, three or more distinct layers. Such layers may exhibit sufficiently distinct density, morphology, crystallinity, open pore volume, closed pore volume, pore size distribution, volume, and mass fractions of the filler materials (e.g., $Al_2O_3$ nanofibers, among other suitable materials), types, compositions and dimensions of filler materials, polymer composition, overall composition, physical, chemical and electrochemical properties and other characteristics that may enable one to distinguish layer(s) from each other.

In some designs, at least one layer of the multi-layered membrane may be produced using non-solvent induced phase separation process (NIPS). In some designs, at least one layer of the multi-layered membrane may comprise dense or porous nanofibers (nanowires) or fibers. In some designs, at least one layer of the multi-layered membrane may comprise a metal oxide filler material. In some designs, at least a portion of a metal oxide filler material may comprise $Al_2O_3$.

In some designs, the total thickness of the disclosed membrane (even if it comprises more than one layer) may preferably range from about 2 microns to about 60 microns. In some designs and applications in Li-ion batteries, the total thickness of the disclosed membrane may preferably range from about 2.5 micron to about 25.0 micron (in some designs from about 2.5 to about 5.0 micron; some designs from about 5 to about 10 micron; in some designs from about 10.0 to about 15.0 micron; in some designs from about 15.0 to about 20.0 micron; in some designs from about 20.0 to about 25.0 micron), when fully compressed in a battery stack or roll or compressed at comparable pressures.

In some designs, the total porosity of the disclosed membrane (even if it comprises more than one layer) may preferably range from about 20 vol. % to about 90 vol. % when compressed in a battery stack or roll (e.g., under 0.1 MPa or 1 MPa or other suitable value of the applied uniaxial pressure, depending on a particular cell design) (in some designs, from about 20 vol. % to about 40 vol. %; in other designs, from about 40 vol. % to about 50 vol. %; in other designs, from about 50 vol. % to about 60 vol. %; in other designs, from about 60 vol. % to about 70 vol. %; in other designs, from about 70 vol. % to about 90 vol. %). In some designs, the total porosity of the disclosed membrane (even if the membrane comprises more than one layer) may preferably range from about 25 vol. % to about 95 vol. % when uncompressed (in some designs, from about 25 vol. % to about 40 vol. %; in other designs, from about 40 vol. % to about 50 vol; in other designs, from about 50 vol. % to about 60 vol. %. %; in other designs, from about 60 vol. % to about 70 vol. %; in other designs, from about 70 vol. % to about 95 vol. %). In some designs, the BET specific surface area of the disclosed membrane (uncompressed) may range from about 1 $m^2$/g to about 200 $m^2$/g. In some designs, over 95% of the (uncompressed) membrane pores exhibit pore sizes in the range from about 1 nm to about 1 micron (in some designs, from about 2 nm to about 500 nm; in other designs, from about 5 nm to about 250 nm). In some designs, the total pore volume of the membrane pores that exhibit characteristic sizes in the range from about 3 nm to about 300 nm (as measured by Mercury porosimetry) may preferably range from about 0.4 cc/g to about 8 cc/g (in some designs, from about 0.4 cc/g to about 1 cc/g; in other designs, from about 1 cc/g to about 2 cc/g; in other designs, from about 2 cc/g to about 3 cc/g; in other designs, from about 3 cc/g to about 4 cc/g; in other designs, from about 4 cc/g to about 5 cc/g; in other designs, from about 5 cc/g to about 6 cc/g; in other designs, from about 6 cc/g to about 7 cc/g; in other designs, from about 7 cc/g to about 8 cc/g).

In some designs, the Gurley numbers of the disclosed (uncompressed) membrane may preferably range from about 20 sec (per 100 cc of air to pass through a fixed area (19.6 $cm^2$) under 0.02 MPa pressure) to about 600 sec (in some designs, from about 20 to about 100 sec; in other designs, from about 100 to about 200 sec; in other designs, from about 200 to about 600 sec).

In some designs, the maximum tensile strength of the disclosed membrane at room temperature may preferably range from about 15 MPa to about 250 MPa (in some designs, from about 15 to about 20 MPa; in other designs from about 20 MPa to about 25 MPa; in other designs from about 25 MPa to about 50 MPa; in other designs from about 50 MPa to about 100 MPa; in other designs from about 100 MPa to about 150 MPa; in yet other designs from about 150 MPa to about 250 MPa).

In some designs, the maximum tensile elongation at break of the disclosed membrane at room temperature may preferably range from about 5% to about 500% (in some designs, from about 5% to about 15%; in other designs, from about 15% to about 25%; in other designs, from about 25% to about 50%; in other designs, from about 50% to about 100%; in other designs, from about 100% to about 500%).

Figure 23:
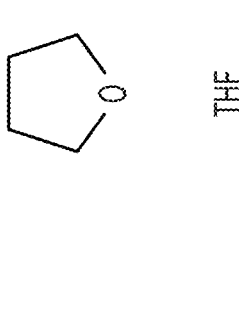
FIG. 23 illustrates example non-aqueous solvents used in some embodiments of the present disclosure.

Although some described membrane fabrication examples utilized water as a polymer non-solvent in a solvent vapor-filled chamber and a coagulation bath and NMP as a polymer solvent, it will be appreciated that in some designs other liquids may be effectively used for such purposes (depending on their miscibility with each other and a particular polymer used—e.g., PEI or another one). FIG. 23 provides illustrative examples of such solvents, which may include acetone, acetonitrile, various alcohols (e.g., methanol, ethanol, propanol, butanol, etc.), tetrahydrofuran (THF), 1,4-dioxane, NMP, DMAC (dimethylacetamide), and DMF (dimethyl formamide), among others. In some designs, different solvents or solvent mixtures may be used in a vapor-filled chamber and in a coagulation bath.

Although some described membrane fabrication examples utilized PEI for the main polymer phase of the composite membrane, it will be appreciated that other classes of polymers and their combination may be used in some designs. The particular choice of the polymer may depend on the particular chemical, thermal, electrochemical, and mechanical properties required or desired in a particular battery (or other suitable) application. FIG. 24 provides illustrative examples of such polymers classified by the functional groups, including polyolefins (e.g., polyethylene, polypropylene, PVC, PTFE, polystyrene, etc.), silicones (e.g., polydimethylsiloxane, etc.), polyethers (e.g., polyether ketone), etc.), polyesters (e.g., poly(ethylene terephthalate), poly(ethylene terephthaldehyde), etc.), polyacrylates (e.g., poly(methyl methacrylate, etc.), polyetherimides, polyurethane, polyamides (e.g., NYLON 66, aramid, etc.), among others.

Note, however, that the selection of suitable polymer needs to be carefully considered for a given application and processing conditions. For example, such polymers need to exhibit good solubility in a suitable slurry solvent and insolubility in the subsequent solvent used in a solvent chamber and a coagulation bath (where the polymer precipitation and pore formation takes place). Polyamides and polyurethanes are typically difficult to process under regular conditions, for example. PDMS exhibit relatively weak mechanical properties and may not be suitable for some applications. If good thermal and flame-retardant criteria are very important, aramids and polyetherimides may be a suitable choice.

Figure 25:
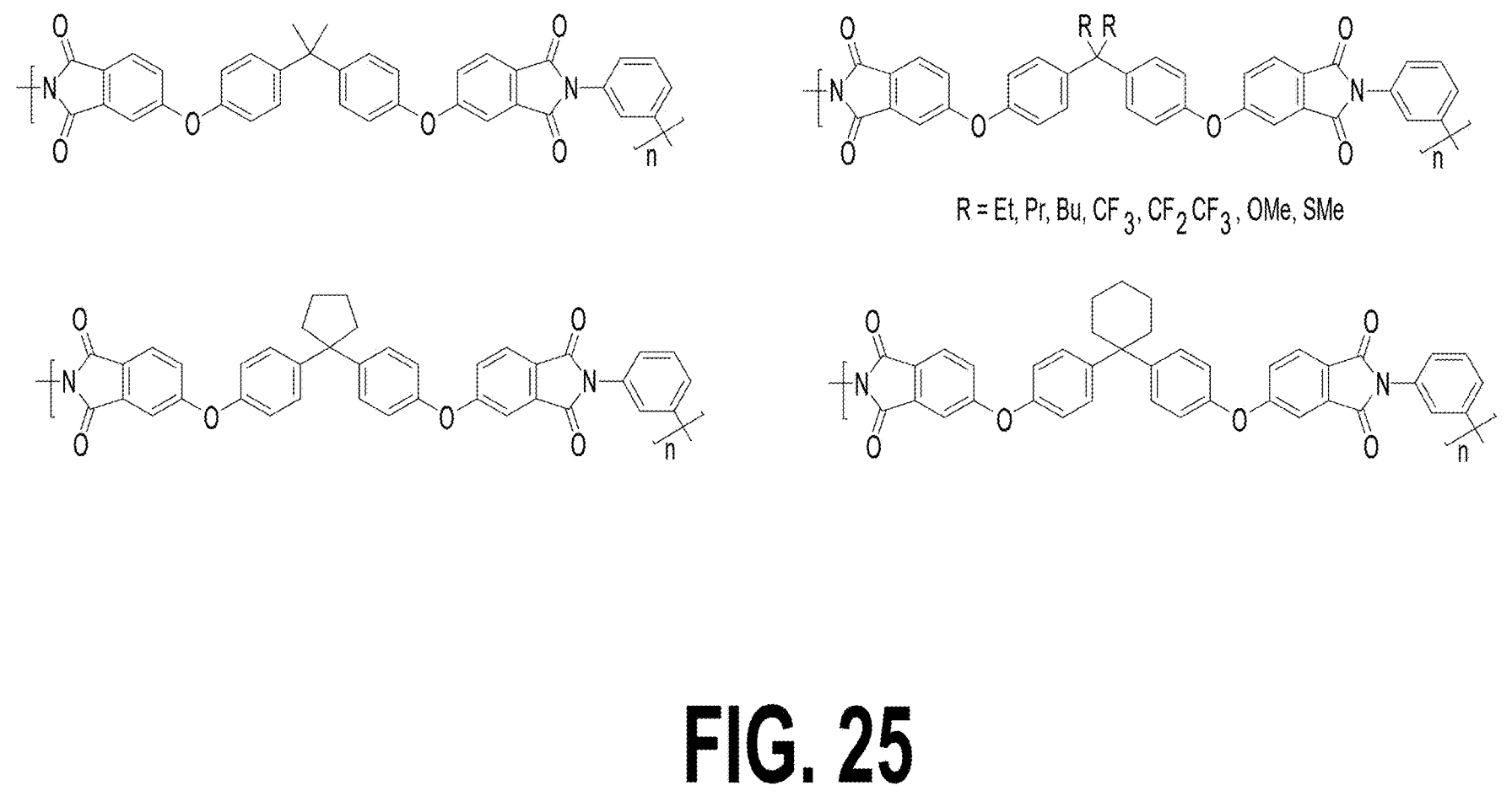

In some designs, various polymers may be used having different ether and imide linkages. FIG. 25 provides illustrative examples of polymer variants based on ether and imide linkages—polyetherimides.

In some designs, polysulfones (e.g., polysulfones, polyethersulfones and polyphenylene sulfones) may also be used instead or in combination with polyimides or other suitable polymers discussed.

Although some described membrane fabrication examples utilized PVP as a water-soluble pore-forming (porosity enhancing) polymer, it will be appreciated that other water-soluble polymers, their various water-soluble copolymers and various water-soluble polymer mixtures may be used as pore enhancing agents in some designs. Illustrative examples of suitable synthetic water soluble polymer classes include, but not limited to poly(ethylene glycol) (PEG), poly(vinyl alcohol) (PVA), poly(acrylic acid) (PAA) and its various salts, poly(oxazoline), poly(acrylamide), poly(phosphate), poly(phosphazene) and their various copolymers with a variety of other functional groups including poly(ethylene oxide), poly(ester), poly(amide), etc. Illustrative examples of suitable natural water-soluble polymer classes include, but not limited to, xantham gum, pectin, chitosan, carboxymethyl cellulose CMC, dextran, hyaluronic acid and its salts, starch and various starch-derivatives, among others. In addition, pore-forming agents may also be any water-soluble compound, organics such as monosaccharides and disaccharides (e.g., glucose, fructose, lactose, sucrose, etc.), alcohols, carboxylic acids, phosphates, amines, esters, salts, etc. (note that their solubility decreases when the molecular mass is high), and various inorganic salts.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A nanocomposite membrane, comprising: a polymer phase comprising a polymer comprising a cyclic imide group; a nanowire phase comprising metal oxide nanowires; and a pore phase, wherein each of the polymer phase and the nanowire phase is uniformly distributed within at least part of the nanocomposite membrane.

Clause 2. The nanocomposite membrane of clause 1, wherein the each of the polymer phase and the nanowire phase is uniformly distributed within all of the nanocomposite membrane.

Clause 3. The nanocomposite membrane of any of clauses 1 to 2, wherein the polymer is a polyetherimide.

Clause 4. The nanocomposite membrane of any of clauses 1 to 3, wherein the metal oxide nanowires comprise $Al_2O_3$ nanowires.

Clause 5. The nanocomposite membrane of any of clauses 1 to 4, wherein the pore phase is characterized by an average pore size of 1 μm or less.

Clause 6. The nanocomposite membrane of any of clauses 1 to 5, wherein a porosity of the nanocomposite membrane in an uncompressed state is in a range of about 25 vol. % to about 95 vol. %.

Clause 7. The nanocomposite membrane of any of clauses 1 to 6, wherein a porosity of the nanocomposite membrane in a compressed state is in a range of about 0.1 MPa to about 1.0 MPa, is in a range of about 20 vol. % to about 90 vol. %.

Clause 8. The nanocomposite membrane of any of clauses 1 to 7, wherein, in an uncompressed state, the nanocomposite membrane exhibits a Gurley number in a range of about 20 seconds to about 600 seconds.

Clause 9. The nanocomposite membrane of any of clauses 1 to 8, wherein the metal oxide nanowires are in a range of about 10 wt. % to about 40 wt. % relative to the polymer and the metal oxide nanowires.

Clause 10. The nanocomposite membrane of any of clauses 1 to 9, wherein the pore phase is uniformly distributed within some or all of the nanocomposite membrane.

Clause 11. The nanocomposite membrane of clause 10, wherein the pore phase is uniformly distributed within all of the nanocomposite membrane.

Clause 12. An electrolyte-separator composite for a battery, comprising: a separator membrane comprising the nanocomposite membrane of claim 1; and a liquid electrolyte filling at least a fraction of the pore phase.

Clause 13. The electrolyte-separator composite of clause 12, wherein a reference electrolyte uptake of the electrolyte-separator composite is 100 wt. % or greater, the reference electrolyte containing $LiPF_6$ and a solvent mixture, the $LiPF_6$ being present at a concentration of 1 M, the solvent mixture containing ethylene carbonate (EC), dimethyl carbonate (DMC), and ethyl methyl carbonate (EMC) in a 1:1:1 volume ratio.

Clause 14. The electrolyte-separator composite of any of clauses 12 to 13, wherein an ionic conductivity of the electrolyte-separator composite is about 0.63 mS/cm or greater.

Clause 15. The electrolyte-separator composite of any of clauses 12 to 14, wherein the polymer is a polyetherimide.

Clause 16. The electrolyte-separator composite of any of clauses 12 to 15, wherein the metal oxide nanowires comprise $Al_2O_3$ nanowires.

Clause 17. The electrolyte-separator composite of any of clauses 12 to 16, wherein the metal oxide nanowires are in a range of about 10 wt. % to about 40 wt. % relative to the polymer and the metal oxide nanowires.

Clause 18. The electrolyte-separator composite of any of clauses 12 to 17, wherein the liquid electrolyte comprises lithium ions and a carbonate solvent.

Clause 19. A battery, comprising: an anode; a cathode; and the electrolyte-separator composite of claim 12 interposed between the anode and the cathode.

Clause 20. A method of making a nanocomposite membrane, comprising: (A1) mixing a water-insoluble polymer composition, water-soluble pore-forming polymer composition, and metal oxide nanowires in a non-aqueous solvent to form a mixture, the water-insoluble polymer composition and the water-soluble pore-forming polymer composition being dissolved in the non-aqueous solvent, the non-aqueous solvent being miscible with water; (A2) casting the mixture onto a substrate to form a film; (A3) immersing the film in a water bath, such that the water-soluble pore-forming polymer composition and the non-aqueous solvent diffuse from the film into the water bath; and (A4) drying the film.

Clause 21. The method of clause 20, wherein the water-insoluble polymer composition comprises a polymer comprising a cyclic imide group.

Clause 22. The method of clause 21, wherein the water-insoluble polymer composition comprises a polyetherimide.

Clause 23. The method of any of clauses 20 to 22, wherein the metal oxide nanowires comprise Al2O3 nanowires.

Clause 24. The method of any of clauses 20 to 23, wherein the water-soluble pore-forming polymer composition comprises poly(vinylpyrrolidone).

Clause 25. The method of any of clauses 20 to 24, wherein the non-aqueous solvent comprises N-methyl-2-pyrrolidone (NMP).

Clause 26. The method of any of clauses 20 to 25, further comprising: (B) subjecting the film to a high-humidity environment in a range of about 90% to about 100% relative humidity at a temperature in a range of about 45° C. to about 55° C.; wherein the subjecting (B) is carried out after the casting (A2) and before the immersing (A3).

This description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A nanocomposite membrane precursor, comprising:
   a first polymer phase comprising a polymer comprising a cyclic imide group;
   a nanowire phase comprising metal oxide or metal hydroxide or metal oxy-hydroxide nanowires; and
   a water-soluble pore-forming polymer phase,
   wherein each of the first polymer phase and the nanowire phase is uniformly distributed within at least part of the nanocomposite membrane precursor.

2. The nanocomposite membrane precursor of claim 1, wherein the each of the first polymer phase and the nanowire phase is uniformly distributed within all of the nanocomposite membrane precursor.

3. The nanocomposite membrane precursor of claim 1, wherein the polymer is a polyetherimide.

4. The nanocomposite membrane precursor of claim 1, wherein the metal oxide or the metal hydroxide or the metal oxy-hydroxide nanowires comprise $Al_2O_3$ or $AlO(OH)$ or $Al(OH)_3$ nanowires.

5. The nanocomposite membrane precursor of claim 1, wherein the metal oxide or the metal hydroxide or the metal oxy-hydroxide nanowires are in a range of about 10 wt. % to about 40 wt. % relative to the first polymer and the metal oxide or the metal hydroxide or the metal oxy-hydroxide nanowires.

6. The nanocomposite membrane precursor of claim 1, wherein the water-soluble pore-forming polymer phase is uniformly distributed within some or all of the nanocomposite membrane precursor.

7. The nanocomposite membrane precursor of claim 6, wherein the water-soluble pore-forming polymer phase is uniformly distributed within all of the nanocomposite membrane precursor.

8. A method, comprising:
   (A1) mixing a water-insoluble polymer composition, water-soluble pore-forming polymer composition, and metal oxide or metal hydroxide or metal oxy-hydroxide nanowires in a non-aqueous solvent to form a mixture, the water-insoluble polymer composition and the water-soluble pore-forming polymer composition being dissolved in the non-aqueous solvent, the non-aqueous solvent being miscible with water;
   (A2) casting the mixture onto a substrate to form a film;
   (A3) immersing the film in a water bath, such that the water-soluble pore-forming polymer composition and the non-aqueous solvent diffuse from the film into the water bath; and
   (A4) drying the film.

9. The method of claim 8, wherein the water-insoluble polymer composition comprises a polymer comprising a cyclic imide group.

10. The method of claim 9, wherein the water-insoluble polymer composition comprises a polyetherimide.

11. The method of claim 8, wherein the metal oxide or the metal hydroxide or the metal oxy-hydroxide nanowires comprise $Al_2O_3$ or $AlO(OH)$ or $Al(OH)_3$ nanowires.

12. The method of claim 8, wherein the water-soluble pore-forming polymer composition comprises poly(vinylpyrrolidone).

13. The method of claim 8, wherein the non-aqueous solvent comprises N-methyl-2-pyrrolidone (NMP).

14. The method of claim 8, further comprising:
   (B) subjecting the film to a high-humidity environment in a range of about 90% to about 100% relative humidity at a temperature in a range of about 45° C. to about 55° C.;
   wherein the subjecting (B) is carried out after the casting (A2) and before the immersing (A3).

15. The method of claim 8, wherein:
   wherein the metal oxide or the metal hydroxide or the metal oxy-hydroxide nanowires are in a range of about 10 wt. % to about 40 wt. % relative to the water-insoluble polymer and the metal oxide or the metal hydroxide or the metal oxy-hydroxide nanowires.

16. The method of claim 8, further comprising:

assembling a battery comprising an anode, a cathode, and the film interposed between the anode and the cathode; and filling a liquid electrolyte in the film.

17. The method of claim 16, wherein:

the liquid electrolyte comprises lithium ions and a carbonate solvent.

5

\* \* \* \* \*